United States Patent
Suzuki

(10) Patent No.: US 10,222,684 B2
(45) Date of Patent: Mar. 5, 2019

(54) PROJECTOR AND CONTROL METHOD FOR PROJECTOR

(71) Applicant: SEIKO EPSON CORPORATION, Tokyo (JP)

(72) Inventor: Junichi Suzuki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/887,168

(22) Filed: Feb. 2, 2018

(65) Prior Publication Data
US 2018/0239227 A1    Aug. 23, 2018

(30) Foreign Application Priority Data

Feb. 23, 2017 (JP) ................... 2017-031829
Feb. 23, 2017 (JP) ................... 2017-031832

(51) Int. Cl.
| | |
|---|---|
| *G03B 21/16* | (2006.01) |
| *H04N 9/31* | (2006.01) |
| *G03B 21/20* | (2006.01) |
| *H05B 41/288* | (2006.01) |

(52) U.S. Cl.
CPC ............ *G03B 21/16* (2013.01); *H04N 9/315* (2013.01); *H04N 9/3144* (2013.01); *G03B 21/2026* (2013.01); *H04N 9/3182* (2013.01); *H05B 41/2887* (2013.01)

(58) Field of Classification Search
CPC ...... G03B 21/16; H04N 9/3144; F21V 29/00; F21V 29/02; F21V 29/503; F21V 29/50; F21V 29/61; F21V 29/67

USPC ................. 362/264, 294, 345, 373
See application file for complete search history.

(56) References Cited

U.S. PATENT DOCUMENTS

| | | | |
|---|---|---|---|
| 9,395,610 B2 | 7/2016 | Suzuki et al. | |
| 2014/0375965 A1* | 12/2014 | Suzuki | G03B 21/16 353/57 |
| 2016/0274445 A1* | 9/2016 | Kito | G03B 21/16 |

FOREIGN PATENT DOCUMENTS

| | | |
|---|---|---|
| JP | 2003-295320 A | 10/2003 |
| JP | 2015-026058 A | 2/2015 |

\* cited by examiner

*Primary Examiner* — Ryan D Howard
(74) *Attorney, Agent, or Firm* — Oliff PLC

(57) ABSTRACT

A projector according to the invention includes a discharge lamp, a cooling section, and a control section. The control section is configured to execute a first cooling control in which a number of revolutions of the cooling section does not depend on an inter-electrode voltage of the discharge lamp and a second cooling control for controlling the cooling section based on first control information indicating a relation between the inter-electrode voltage and the number of revolutions. The number of revolutions in the first cooling control is equal to or smaller than the number of revolutions in the second cooling control. When the inter-electrode voltage is larger than a first voltage value or when a cumulative lighting time of the discharge lamp is larger than a first time, the control section configured to switch the control of the cooling section from the first cooling control to the second cooling control.

16 Claims, 10 Drawing Sheets

PROJECTOR AND CONTROL METHOD FOR PROJECTOR

BACKGROUND

1. Technical Field

The present invention relates to a projector and a control method for the projector.

2. Related Art

There is known a projector that changes the number of revolutions of a cooling fan that cools a discharge lamp. For example, JP-A-2003-295320 (Patent Literature 1) describes a configuration for changing the number of revolutions of a cooling fan according to electric power supplied to a discharge lamp.

However, for example, there is an individual difference in the discharge lamp because of variation of manufacturing. Therefore, even if the number of revolutions of the cooling fan (a cooling section) is changed using the method explained above, appropriate cooling cannot be performed depending on the discharge lamp. Therefore, the life of the discharge lamp sometimes cannot be sufficiently improved.

SUMMARY

An advantage of some aspects of the invention is to provide a projector capable of appropriately cooling a discharge lamp and a control method for such a projector.

An aspect of a projector according to the invention includes: a discharge lamp including a pair of electrodes and configured to emit light; a cooling section configured to cool the discharge lamp; a control section configured to control the cooling section; a light modulating device configured to modulate the light emitted from the discharge lamp according to image information; and a projection optical device configured to project the light modulated by the light modulating device. The control section is configured to execute a first cooling control in which a number of revolutions of the cooling section does not depend on an inter-electrode voltage of the discharge lamp and a second cooling control for controlling the cooling section based on first control information indicating a relation between the inter-electrode voltage and the number of revolutions. The number of revolutions in the first cooling control is equal to or smaller than the number of revolutions in the second cooling control. When the inter-electrode voltage is larger than a first voltage value or when a cumulative lighting time of the discharge lamp is larger than a first time, the control section is configured to switch the control of the cooling section from the first cooling control to the second cooling control.

According to the aspect of the projector, when the inter-electrode voltage is larger than the first voltage value or when the cumulative lighting time is larger than the first time, the control section switches the control of the cooling section from the first cooling control to the second cooling control. That is, when the inter-electrode voltage is equal to or smaller than the first voltage value or when the cumulative lighting time is equal to or smaller than the first time, the control section executes the first cooling control which does not depend on the inter-electrode voltage and in which the number of revolutions is equal to or smaller than the number of revolutions of the cooling section in the second cooling control. Therefore, it is possible to control the number of revolutions of the cooling section at an initial stage irrespective of manufacturing variation of the discharge lamp and to prevent the number of revolutions of the cooling section from increasing. Consequently, it is possible to prevent blackening and devitrification from occurring in the discharge lamp at the initial stage.

When the discharge lamp is lit for a certain degree of time and the cumulative lighting time increases to a certain degree, the blackening less easily occurs. When the discharge lamp is in such a state, it is desirable to perform the second cooling control for changing the number of revolutions of the cooling section according to the inter-electrode voltage. This is because, by maintaining the temperature of the discharge lamp at a proper temperature, it is possible to prevent an integrated value of the temperature of the discharge lamp from increasing and extend a time until the occurrence of the devitrification.

On the other hand, according to the aspect of the projector, when the inter-electrode voltage is larger than the first voltage value, the control of the cooling section is switched from the first cooling control to the second cooling control. Therefore, after a certain degree of the cumulative lighting time elapses, it is possible to suitably switch the control of the cooling section. Therefore, when the inter-electrode voltage is larger than the first voltage value, it is possible to suitably cool the discharge lamp.

As explained above, according to the aspect of the projector, it is possible to obtain the projector capable of appropriately cooling the discharge lamp irrespective of the manufacturing variation of the discharge lamp. Consequently, it is possible to improve the life of the discharge lamp.

The number of revolutions in the first cooling control may be constant.

With this configuration, at the initial stage of the discharge lamp, it is easy to maintain the number of revolutions of the cooling section at a value for preventing the blackening from easily occurring.

The relation, indicated by the first control information, between the inter-electrode voltage and the number of revolutions may be indicated by a linear function.

With this configuration, by controlling the number of revolutions of the cooling section on the basis of the first control information, it is possible to maintain the temperature of the discharge lamp, which changes in a linear function manner with respect to the inter-electrode voltage, at a constant value. Consequently, it is possible to maintain the temperature of the discharge lamp at a proper temperature according to the second cooling control. It is possible to further improve the life of the discharge lamp.

The number of revolutions in the first cooling control may be smaller than the number of revolutions in the second cooling control at the time when the inter-electrode voltage is the first voltage value or may be smaller than the number of revolutions in the second cooling control at the time when the cumulative lighting time is the first time.

With this configuration, at the initial stage of the discharge lamp, it is possible to further reduce the number of revolutions of the cooling section. Even when an initial inter-electrode voltage is smaller than a target value because of manufacturing variation of the discharge lamp, it is possible to prevent the blackening from occurring.

The control section may be configured to execute a third cooling control for controlling the cooling section based on second control information indicating a relation between the inter-electrode voltage and the number of revolutions. A degree of the number of revolutions corresponding to the inter-electrode voltage in the second control information may be larger than a degree of the number of revolutions corresponding to the inter-electrode voltage in the first control information. When devitrification is generated in the discharge lamp, the control section may switch the control of the cooling section from the first cooling control or the second cooling control to the third cooling control.

With this configuration, after the devitrification occurs in the discharge lamp, it is possible to increase a cooling degree of the discharge lamp. It is possible to suitably cool the discharge lamp. Consequently, it is possible to further improve the life of the discharge lamp.

The relation, indicated by the first control information, between the inter-electrode voltage and the number of revolutions may be indicated by a linear function. The relation, indicated by the second control information, between the inter-electrode voltage and the number of revolutions may be indicated by a linear function. A ratio of a change amount of the number of revolutions to a change amount of the inter-electrode voltage in the second control information may be larger than the ratio in the first control information.

With this configuration, it is easy to suitably change the number of revolutions of the cooling section to offset a change in the temperature of the discharge lamp that occurs according to a change in the inter-electrode voltage after the occurrence of the devitrification. It is easy to set the temperature of the discharge lamp to a suitable value. Therefore, it is possible to further improve the life of the discharge lamp. When the devitrification is generated in the discharge lamp, the control section may increase the number of revolutions. When the cumulative lighting time of the discharge lamp is equal to or larger than a predetermined value, the control section may determine that the devitrification is generated in the discharge lamp.

An aspect of a projector according to the invention includes: a discharge lamp including a pair of electrodes and configured to emit light; a cooling section configured to cool the discharge lamp; a control section configured to control the cooling section; a light modulating device configured to modulate the light emitted from the discharge lamp according to image information; and a projection optical device configured to project the light modulated by the light modulating device. The control section controls the cooling section based on control information indicating a relation between an inter-electrode voltage of the discharge lamp and a number of revolutions of the cooling section. When devitrification is generated in the discharge lamp, the control section is configured to increase a degree of the number of revolutions corresponding to the inter-electrode voltage in the control information.

For example, in the discharge lamp, devitrification sometimes occurs in which the inner wall of the discharge lamp is heated to be crystallized and clouded. When the light of the discharge lamp is irradiated on a devitrified portion of the inner wall of the discharge lamp, the irradiated light is scattered and a part of the light is absorbed by the devitrified portion. Therefore, the temperature of the devitrified portion of the discharge lamp rises. Consequently, in the discharge lamp after the occurrence of the devitrification, the temperature of the discharge lamp easily rises compared with before the occurrence of the devitrification. Therefore, when the devitrification occurs in the discharge lamp, the discharge lamp sometimes cannot be appropriately cooled by a method of simply changing the number of revolutions of the cooling section according to driving power supplied to the discharge lamp. Therefore, the life of the discharge lamp sometimes cannot be sufficiently improved.

On the other hand, according to the aspect of the projector, when determining that devitrification occurs in the discharge lamp, the control section increases a degree of the number of revolutions of the cooling section corresponding to the inter-electrode voltage in the control information. Therefore, after the devitrification occurs in the discharge lamp, it is possible to increase a cooling degree of the discharge lamp. It is possible to suitably cool the discharge lamp. Therefore, according to the aspect of the projector, it is possible to obtain the projector capable of appropriately cooling the discharge lamp even when the devitrification occurs. Consequently, it is possible to improve the life of the discharge lamp.

The relation, indicated by the control information, between the inter-electrode voltage and the number of revolutions may be indicated by a linear function. When the devitrification is generated in the discharge lamp, the control section may increase a ratio of a change amount of the number of revolutions to a change amount of the inter-electrode voltage in the control information.

With this configuration, it is easy to suitably change the number of revolutions of the cooling section to offset a change in the temperature of the discharge lamp that occurs according to a change in the inter-electrode voltage after the occurrence of the devitrification. It is easy to set the temperature of the discharge lamp to a suitable value. Therefore, it is possible to further improve the life of the discharge lamp.

When the devitrification is generated in the discharge lamp, the control section may increase the ratio in a range smaller than three times.

With this configuration, it is easy to more suitably cool the discharge lamp after the occurrence of the devitrification. It is possible to further improve the life of the discharge lamp.

When the devitrification is generated in the discharge lamp, the control section may increase the number of revolutions.

With this configuration, immediately after the devitrification occurs, it is possible to increase the number of revolutions of the cooling section and improve a cooling degree of the discharge lamp. Consequently, it is possible to more suitably cool the discharge lamp.

When a cumulative lighting time of the discharge lamp is equal to or larger than a predetermined value, the control section may determine that the devitrification is generated in the discharge lamp.

With this configuration, the control section can easily detect the devitrification by using the predetermined value experimentally calculated in advance or estimating the predetermined value. Therefore, when the devitrification occurs in the discharge lamp, it is possible to suitably increase a degree of the number of revolutions of the cooling section corresponding to the inter-electrode voltage in the control information.

An aspect of a control method for a projector according to the invention includes a discharge lamp including a pair of electrodes and a cooling section configured to cool the discharge lamp, the control method including executing a first cooling control in which a number of revolutions of the cooling section does not depend on an inter-electrode voltage of the discharge lamp and a second cooling control for controlling the cooling section based on first control information indicating a relation between the inter-electrode voltage and the number of revolutions, wherein the number of revolutions in the first cooling control is equal to or smaller than the number of revolutions in the second cooling control; and switching the control of the cooling section from the first cooling control to the second cooling control when the inter-electrode voltage is larger than a first voltage value or when a cumulative lighting time of the discharge lamp is larger than a first time.

According to the aspect of the method, as in the aspect explained above, it is possible to obtain the control method for the projector capable of appropriately cooling the discharge lamp irrespective of manufacturing variation of the discharge lamp.

An aspect of a control method for a projector according to the invention includes a discharge lamp including a pair of electrodes and a cooling section configured to cool the discharge lamp, the control method including: controlling the cooling section based on control information indicating a relation between an inter-electrode voltage of the discharge lamp and a number of revolutions of the cooling section; and increasing a degree of the number of revolutions corresponding to the inter-electrode voltage in the control information when devitrification is generated in the discharge lamp.

According to the aspect of the control method, as in the aspect explained above, it is possible to obtain the control method for the projector capable of appropriately cooling the discharge lamp even when the devitrification occurs.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
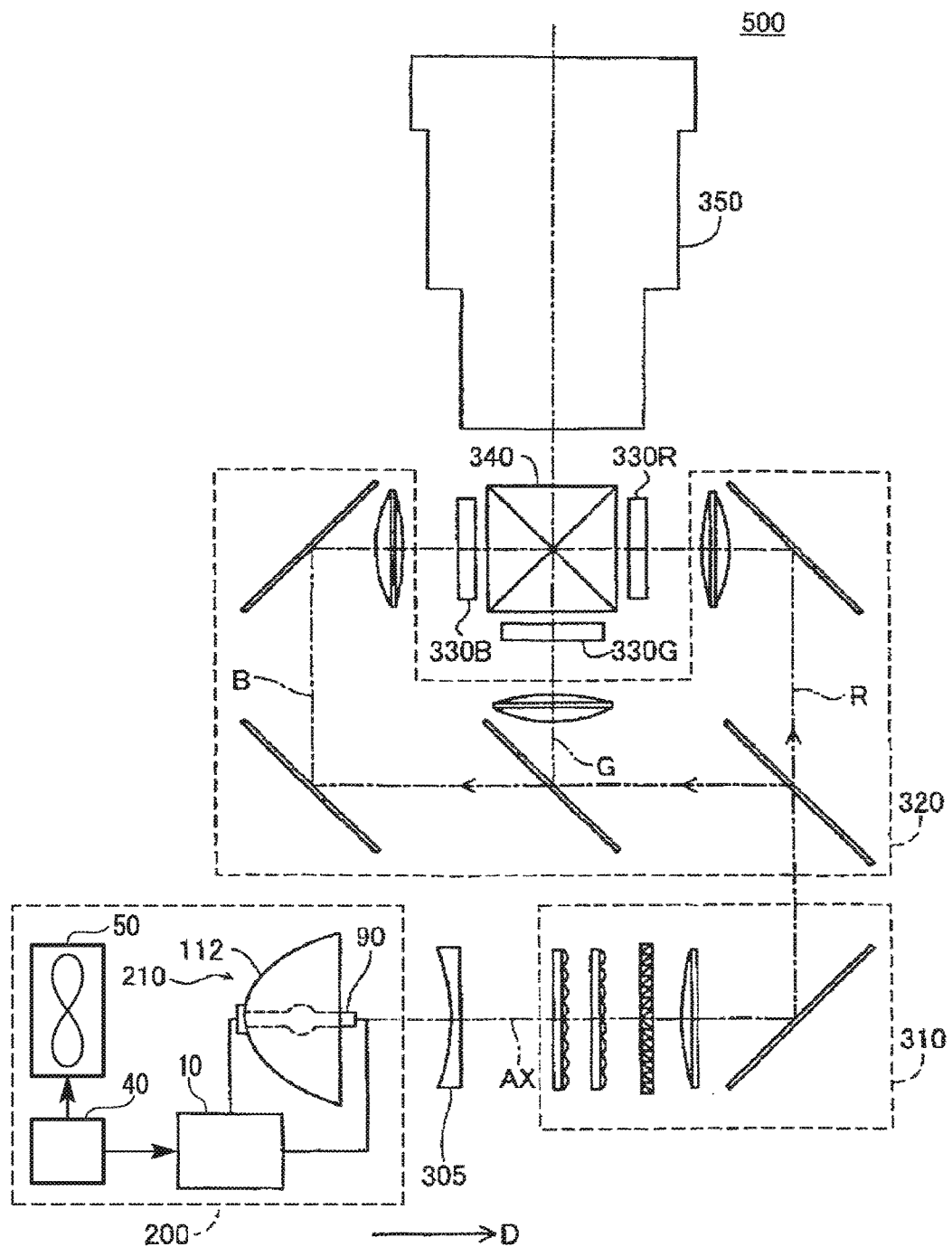
FIG. 1 is a schematic configuration diagram of a projector in a first embodiment.

Projectors according to embodiments of the invention are explained below with reference to the drawings.

Note that the scope of the invention is not limited to the embodiments explained below and can be optionally changed within a scope of a technical idea of the invention. In the drawings referred to below, scales, numbers, and the like in respective structures are sometimes differentiated from those in actual structures to clearly show components.

First Embodiment

FIG. 1 is a schematic configuration diagram of a projector 500 in a first embodiment. As shown in FIG. 1, the projector 500 in this embodiment includes a light source device 200, a collimating lens 305, an illumination optical system 310, a color separation optical system 320, three liquid crystal light valves (light modulating devices) 330R, 330G, and 330B, a cross dichroic prism 340, and a projection optical device 350.

Light emitted from the light source device 200 passes through the collimating lens 305 and is made incident on the illumination optical system 310. The collimating lens 305 collimates the light from the light source device 200.

The illumination optical system 310 adjusts the illuminance of the light emitted from the light source device 200 to be equalized on the liquid crystal light valves 330R, 330G, and 330B. Further, the illumination optical system 310 aligns polarization directions of the light emitted from the light source device 200 in one direction. This is for the purpose of effectively using the light emitted from the light source device 200 in the liquid crystal light valves 330R, 330G, and 330B.

The light with the illuminance distribution and the polarization directions adjusted is made incident on the color separation optical system 320. The color separation optical system 320 separates the incident light into three color lights, that is, red light (R), green light (G), and blue light (B). The three color lights are respectively modulated according to image signals (image information) by the liquid crystal light valves 330R, 330G, and 330B associated with the color lights. That is, the liquid crystal light valves 330R, 330G, and 330B modulate, according to the image information, light emitted from a discharge lamp 90. The liquid crystal light valves 330R, 330G, and 330B include liquid crystal panels 560R, 560G, and 560B explained below and polarizing plates (not shown in FIG. 1). The polarizing plates are disposed on a light incident side and a light emission side of each of the liquid crystal panels 560R, 560G, and 560B.

The modulated three color lights are combined by the cross dichroic prism 340. Combined light is made incident on the projection optical device 350. The projection optical device 350 projects the incident light on a screen 700 (see FIG. 6). That is, the projection optical device 350 projects the light modulated by the liquid crystal light valves 330R, 330G, and 330B. Consequently, a video is displayed on the screen 700. Note that well-known configurations can be adopted as the respective configurations of the collimating lens 305, the illumination optical system 310, the color separation optical system 320, the cross dichroic prism 340, and the projection optical device 350.

The light source device 200 includes a light source unit 210, a discharge lamp lighting device 10, a control section 40, and a cooling section 50.

Figure 2:
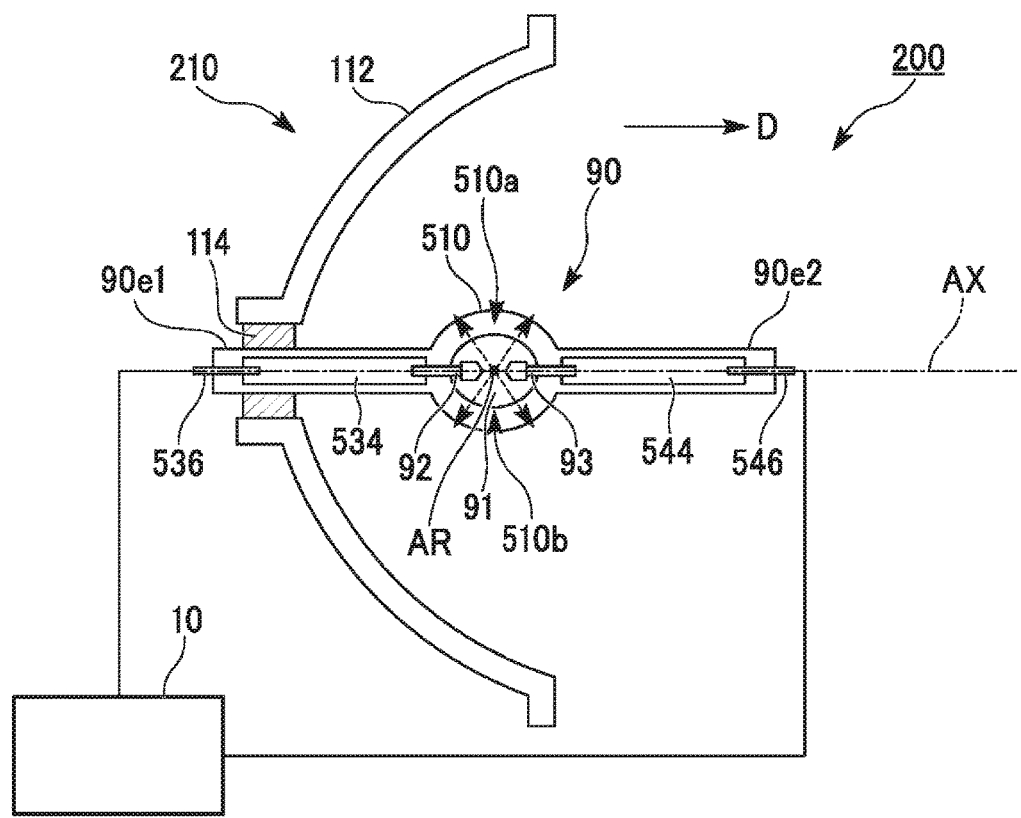
FIG. 2 is a diagram showing a light source device in the first embodiment.

FIG. 2 is a diagram showing the light source device 200. In FIG. 2, a sectional view of the light source unit 210 is shown. In FIG. 2, illustration of the control section 40 and the cooling section 50 is omitted.

The light source unit 210 includes, as shown in FIG. 2, the discharge lamp 90 and a reflection mirror 112. The discharge lamp 90 emits light. The discharge lamp lighting device 10 supplies a driving current I to the discharge lamp 90 to light the discharge lamp 90. The reflection mirror 112 reflects light emitted from the discharge lamp 90 to an irradiating direction D. The irradiating direction D is parallel to an optical axis AX of the discharge lamp 90.

The discharge lamp 90 includes a discharge lamp main body 510 and a first electrode (an electrode) 92 and a second electrode (an electrode) 93 functioning as a pair of electrodes. The shape of the discharge lamp main body 510 is a bar shape extending along the radiating direction D. One end portion of the discharge lamp main body 510, that is, one end portion of the discharge lamp 90 is referred to as first end portion 90e1. The other end portion of the discharge lamp main body 510, that is, the other end portion of the discharge lamp 90 is referred to as second end portion 90e2. The discharge lamp main body 510 includes a top section 510a and a bottom section 510b. The top section 510a is an end portion on a vertical direction upper side in the discharge lamp main body 510. The bottom section 510b is an end portion on a vertical direction lower side in the discharge lamp main body 510.

The material of the discharge lamp main body 510 is, for example, a translucent material such as quartz glass. The center of the discharge lamp main body 510 is swelled in a spherical shape. The inside of the discharge lamp main body 510 is a discharge space 91. In the discharge space 91, gas, which is an electric discharge medium, including halogen, mercury, rare gas, and a metal halogen compound is encapsulated. The halogen includes, for example, bromine Br.

The distal ends of the first electrode 92 and the second electrode 93 project into the discharge space 91. The first electrode 92 is disposed on the first end portion 90e1 side of the discharge space 91. The second electrode 93 is disposed on the second end portion 90e2 side of the discharge space 91. The shape of the first electrode 92 and the second electrode 93 are a bar shape extending along the optical axis AX. In the discharge space 91, electrode distal end portions of the first electrode 92 and the second electrode 93 are disposed to be spaced apart by a predetermined distance and opposed to each other. The material of the first electrode 92 and the second electrode 93 is metal such as tungsten.

Figure 3:
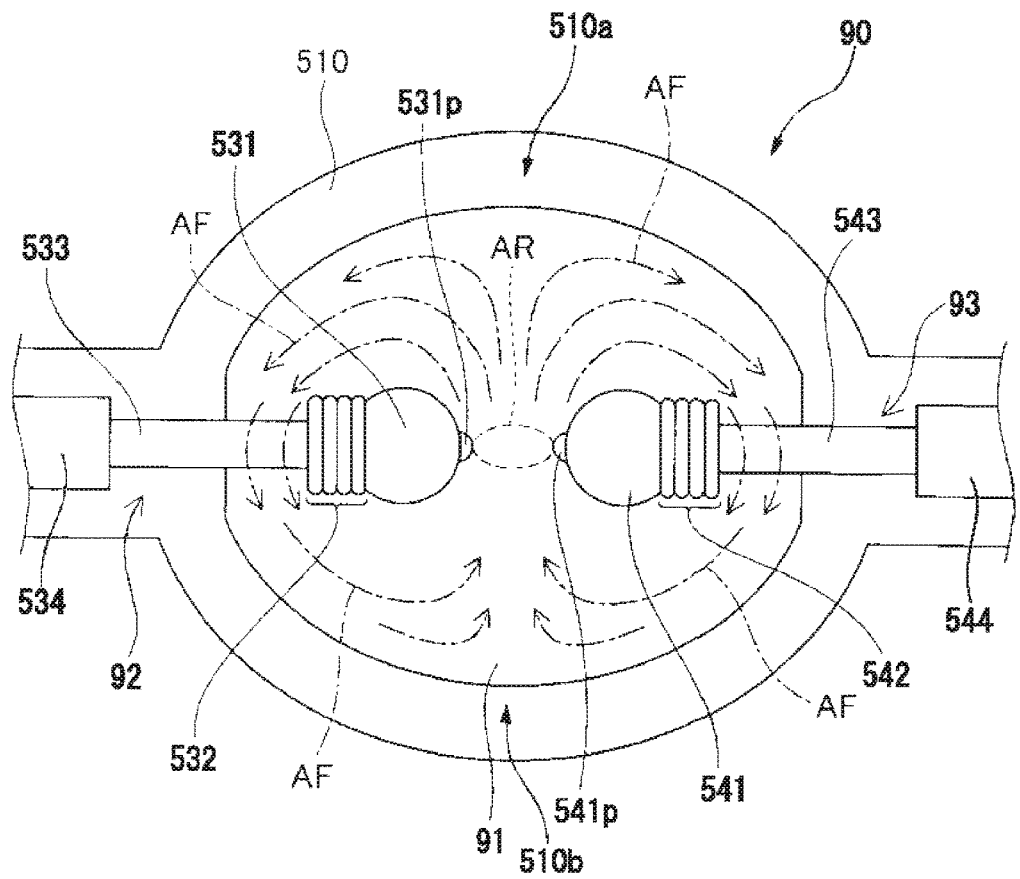
FIG. 3 is a partially enlarged sectional view of a discharge lamp in the first embodiment.

FIG. 3 is an enlarged sectional view showing the portion of the discharge lamp 90.

The first electrode 92 includes, as shown in FIG. 3, a core bar 533, a coil section 532, a main body section 531, and a protrusion 531p. The first electrode 92 is formed by winding a wire rod of an electrode material (tungsten, etc.) on the core car 533 to form the coil section 532 and heating and melting the formed coil section 532 at a stage before the encapsulation in the discharge lamp main body 510. Consequently, the main body section 531 having a large heat capacity is formed on the distal end side of the first electrode 92. The protrusion 531p is formed by lighting the manufactured discharge lamp 90 to melt and coagulate a part of the distal end of the main body section 531. The protrusion 531p is a generation position of an arc AR.

The second electrode 93 includes a core bar 543, a coil section 542, a main body section 541, and a protrusion 541p. The second electrode 93 is formed in the same manner as the first electrode 92.

Note that, since the first electrode 92 and the second electrode 93 have the same configuration, in the following explanation, only the first electrode 92 is sometimes representatively explained. Since the protrusion 531p at the distal end of the first electrode 92 and the protrusion 541p at the distal end of the second electrode 93 have the same configuration, in the following explanation, only the protrusion 531p is sometimes representatively explained.

As shown in FIG. 2, a first terminal 536 is provided at the first end portion 90e1 of the discharge lamp 90. The first terminal 536 and the first electrode 92 are electrically connected by a conductive member 534 that pierces through the inside of the discharge lamp 90. Similarly, a second terminal 546 is provided at the second end portion 90e2 of the discharge lamp 90. The second terminal 546 and the second electrode 93 are electrically connected by a conductive member 544 that pierces through the inside of the discharge lamp 90. The material of the first terminal 536 and the second terminal 546 is metal such as tungsten. As the material of the conductive members 534 and 544, for example, molybdenum foil is used.

The first terminal 536 and the second terminal 546 are connected to the discharge lamp lighting device 10. The discharge lamp lighting device 10 supplies driving power for driving the discharge lamp 90 to the first terminal 536 and the second terminal 546. As a result, arc discharge occurs between the first electrode 92 and the second electrode 93. Light (discharge light) generated by the arc discharge is irradiated toward all directions from a discharge position as indicated by broken line arrows.

As shown in FIG. 3, when the discharge lamp 90 is lit, the gas encapsulated in the discharge space 91 is heated by the generation of the arc AR and convected in the discharge space 91. In detail, the arc AR and a region near the arc AR have an extremely high temperature. Therefore, in the discharge space 91, convection currents AF (indicated by arrows of alternate long and short dash lines in FIG. 3) flowing from the arc AR to the vertical direction upper side are formed. The convection currents AF descend while being cooled by hitting the inner wall of the discharge lamp main body 510, moving along the inner wall of the discharge lamp main body 510, and passing through the core bars 533 and 543 and the like of the first electrode 92 and the second electrode 93.

The descended convection currents AF further descend along the inner wall of the discharge lamp main body 510. However, the convection currents AF collide with one another on the vertical direction lower side of the arc AR and ascend to be returned to the arc AR in the upward direction. The convection currents AF move along the inner wall of the discharge lamp main body 510, whereby the discharge lamp main body 510 is heated. The convection currents AF have the highest temperature on the vertical direction upper side of the arc AR. Therefore, the top section 510a of the discharge lamp main body 510 in contact with the convection currents AF on the vertical direction upper side of the arc AR is a most heated section having the highest temperature in the discharge lamp main body 510 (the discharge lamp 90). On the other hand, the temperature of the convection currents AF is low on the vertical direction lower side in the discharge space 91. Therefore, the temperature of the bottom section 510b is lower than the temperature of the top section 510a.

As shown in FIG. 2, the reflection mirror 112 is fixed to the first end portion 90e1 of the discharge lamp 90 by a fixing member 114. The reflection mirror 112 reflects, toward the irradiating direction D, light traveling toward the opposite side of the irradiating direction D in the discharge light. The shape of a reflection surface (a surface on the discharge lamp 90 side) of the reflection mirror 112 is not particularly limited within a range in which the discharge light can be reflected toward the irradiating direction D. The shape of the reflection surface may be a spheroidal shape or may be a rotated parabolic shape. For example, when the shape of the reflection surface of the reflection mirror 112 is the rotated parabolic shape, the reflection surface 112 can convert the discharge light into light substantially parallel to the optical axis AX. Consequently, it is possible to omit the collimating lens 305.

The material of the fixing member 114 is not particularly limited in a range in which the material is a heat resistant material that can withstand heat generation from the discharge lamp 90. The material is, for example, an inorganic adhesive.

Figure 4:
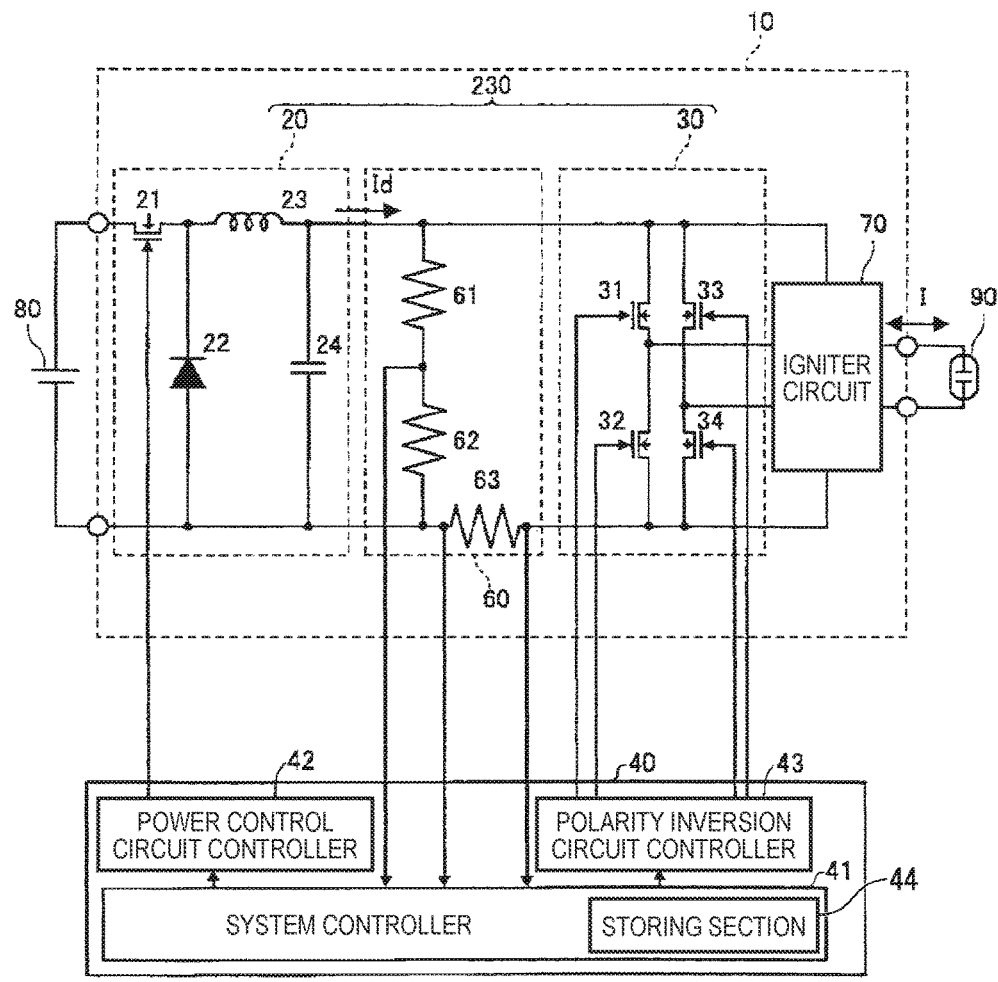
FIG. 4 is a circuit diagram of a discharge lamp lighting device and a control section in the first embodiment.

FIG. 4 is a diagram showing an example of a circuit configuration of the discharge lamp lighting device 10 and the control section 40.

The discharge lamp lighting device 10 includes, as shown in FIG. 4, a power control circuit 20, a polarity inversion circuit 30, an operation detecting section 60, and an igniter circuit 70.

The power control circuit 20 generates driving power supplied to the discharge lamp 90. In this embodiment, the power control circuit 20 is configured by a down-chopper circuit that receives a voltage from a direct current power supply device 80 as an input, steps down the input voltage, and outputs a direct current Id.

The power control circuit 20 includes a switch element 21, a diode 22, a coil 23, and a capacitor 24. The switch element 21 is configured by, for example, a transistor. In this embodiment, one end of the switch element 21 is connected to a positive voltage side of the direct current power supply device 80. The other end is connected to a cathode terminal of the diode 22 and one end of the coil 23.

One end of the capacitor 24 is connected to the other end of the coil 23. The other end of the capacitor 24 is connected to an anode terminal of the diode 22 and a negative voltage side of the direct current power supply device 80. A current control signal is input to a control terminal of the switch element 21 from the control section 40. ON/OFF of the switch element 21 is controlled. As the current control signal, for example, a PWM (Pulse Width Modulation) control signal may be used.

When the switch terminal 21 is turned on, an electric current flows to the coil 23. Energy is stored in the coil 23. Thereafter, when the switch element 21 is turned off, the energy stored in the coil 23 is discharged through a route that passes the capacitor 24 and the diode 22. As a result, the direct current Id corresponding to a ratio of a time when the switch element 21 is turned on is generated.

The polarity inversion circuit 30 inverts, at predetermined timing, the polarity of the direct current Id input from the power control circuit 20. Consequently, the polarity inversion circuit 30 generates the driving current I, which is a direct current that continues for a controlled time, or the driving current I, which is an alternating current having any frequency, and outputs the driving current I. In this embodiment, the polarity inversion circuit 30 is configured by an inverter bridge circuit (a full-bridge circuit).

The polarity inversion circuit 30 includes a first switch element 31, a second switch element 32, a third switch element 33, and a fourth switch element 34 configured by transistors or the like. The polarity inversion circuit 30 includes a configuration in which the first switch element 31 and the second switch element 32 connected in series and the third switch element 33 and the fourth switch element 34 connected in series are connected in parallel to each other. Polarity inversion control signals are respectively input to control terminals of the first switch element 31, the second switch element 32, the third switch element 33, and the fourth switch element 34 from the control section 40. ON/OFF operations of the first switch element 31, the second switch element 32, the third switch element 33, and the fourth switch element 34 are controlled on the basis of the polarity inversion control signals.

The polarity inversion circuit 30 repeats operation for alternately turning on and off the first and fourth switch elements 31 and 34 and the second and third switch elements 32 and 33. Consequently, the polarity of the direct current Id output from the power control circuit 20 is alternately inverted. The polarity inversion circuit 30 generates the driving current I, which is a direct current that continues the same polarity state for a controlled time, or the driving current I, which is an alternating current having a controlled frequency, and outputs the driving current I from a common connection point of the first switch element 31 and the second switch element 32 and a common connection point of the third switch element 33 and the fourth switch element 34.

That is, the polarity inversion circuit 30 is controlled such that, when the first switch element 31 and the fourth switch element 34 are on, the second switch element 32 and the third switch element 33 are off and, when the first switch element 31 and the fourth switch element 34 are off, the second switch element 32 and the third switch element 33 are on. Therefore, when the first switch element 31 and the fourth switch element 34 are on, the driving current I that flows from one end of the capacitor 24 to the first switch element 31, the discharge lamp 90, and the fourth switch element 34 in this order is generated. When the second switch element 32 and the third switch element 33 are on, the driving current I that flows from one end of the capacitor 24 to the third switch element 33, the discharge lamp 90, and the second switch element 32 in this order is generated.

In this embodiment, a combined portion of the power control circuit 20 and the polarity inversion circuit 30 corresponds to a discharge lamp driving section 230. That is, the discharge lamp driving section 230 supplies the driving current I for driving the discharge lamp 90 to the discharge lamp 90.

The operation detecting section 60 includes a voltage detecting section that detects a lamp voltage (an interelectrode voltage) Vla of the discharge lamp 90 and outputs lamp voltage information to the control section 40. The operation detecting section 60 includes a current detecting section that detects the driving current I and outputs driving current information to the control section 40. In this embodiment, the operation detecting section 60 includes a first resistor 61, a second resistor 62, and a third resistor 63.

In this embodiment, the voltage detecting section of the operation detecting section 60 detects the lamp voltage Vla with voltages divided by the first resistor 61 and the second resistor 62 connected in parallel to the discharge lamp 90 and connected in series to each other. In this embodiment, the current detecting section detects the driving current I with a voltage generated in the third resistor 63 connected in series to the discharge lamp 90.

The igniter circuit 70 operates only during a lighting start of the discharge lamp 90. The igniter circuit 70 supplies, to between electrodes (between the first electrode 92 and the second electrode 93) of the discharge lamp 90, a high voltage (a voltage higher than a voltage during normal lighting of the discharge lamp 90) necessary for causing dielectric breakdown between the electrodes (between the first electrode 92 and the second electrode 93) of the discharge lamp 90 to form a discharge path during the lighting start of the discharge lamp 90. In this embodiment, the igniter circuit 70 is connected in parallel to the discharge lamp 90.

The control section 40 controls various operations from an operation start to an operation stop of the projector 500. The control section 40 controls the discharge lamp driving section 230 according to a driving current waveform of the driving current I. The control section 40 controls the cooling section 50. In the example shown in FIG. 4, the control section 40 controls the power control circuit 20 and the polarity inversion circuit 30 to thereby control parameters such as a retention time in which the driving current I continues in the same polarity, a current value of the driving current I, and a frequency of the driving current I. The control section 40 performs, on the polarity inversion circuit 30, polarity inversion control for controlling the retention time in which the driving current I continues in the same polarity, the frequency of the driving current I, and the like according to polarity inversion timing of the driving current I. The control section 40 performs, on the power control circuit 20, current control for controlling a current value of the direct current Id to be output.

The configuration of the control section 40 is not particularly limited. In this embodiment, the control section 40 includes a system controller 41, a power control circuit controller 42, and a polarity inversion circuit controller 43. Note that a part or the entire control section 40 may be configured by a semiconductor integrated circuit.

The system controller 41 controls the power control circuit controller 42 and the polarity inversion circuit controller 43 to thereby control the power control circuit 20 and the polarity inversion circuit 30. The system controller 41 may control the power control circuit controller 42 and the polarity inversion circuit controller 43 on the basis of the lamp voltage Vla and the driving current I detected by the operation detecting section 60.

In this embodiment, a storing section 44 is connected to the system controller 41.

The system controller 41 may control the power control circuit 20 and the polarity inversion circuit 30 on the basis of information stored in the storing section 44. Information concerning driving parameters such as the retention time in which the driving current I continues in the same polarity, the current value of the driving current I, a frequency, a waveform, and a modulation pattern of the driving current I may be stored in the storing section 44.

The power control circuit controller 42 outputs a current control signal to the power control circuit 20 on the basis of the control signal from the system controller 41 to thereby control the power control circuit 20.

The polarity inversion circuit controller 43 outputs a polarity inversion control signal to the polarity inversion circuit 30 on the basis of the control signal from the system controller 41 to thereby control the polarity inversion circuit 30.

The control section 40 is realized using a dedicated circuit and can perform the control explained above and various controls of processing explained below. On the other hand, for example, the control section 40 can also function as a computer by executing a control program stored in the storing section 44 and perform various controls of these kinds of processing.

Figure 5:
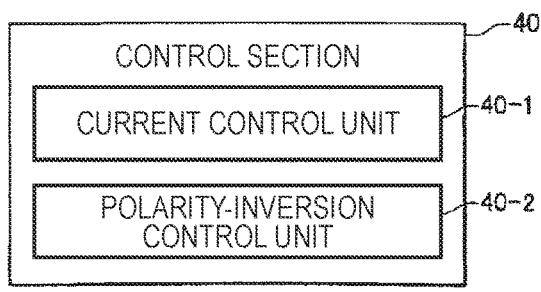
FIG. 5 is a block diagram showing a configuration example of a control section in the first embodiment.

FIG. 5 is a diagram for explaining another configuration example of the control section 40. As shown in FIG. 5, the control section 40 may be configured to function as, according to the control program, a current control unit 40-1 for controlling the power control circuit 20 and a polarity-inversion control unit 40-2 for controlling the polarity inversion circuit 30.

The cooling section 50 cools the discharge lamp 90 of the light source unit 210. The cooling section 50 is configured by, for example, a fan. The fan of the cooling section 50 is configured by, for example, a sirocco fan. The fan of the cooling section 50 sucks the air on the inside and the outside of a housing of the projector 500 and blows cooling air to the light source unit 210. More in detail, the cooling section 50 blows the cooling air to the top section 510a of the discharge lamp main body 510 and cools the top section 510a.

A circuit configuration of the projector 500 is explained below.

Figure 6:
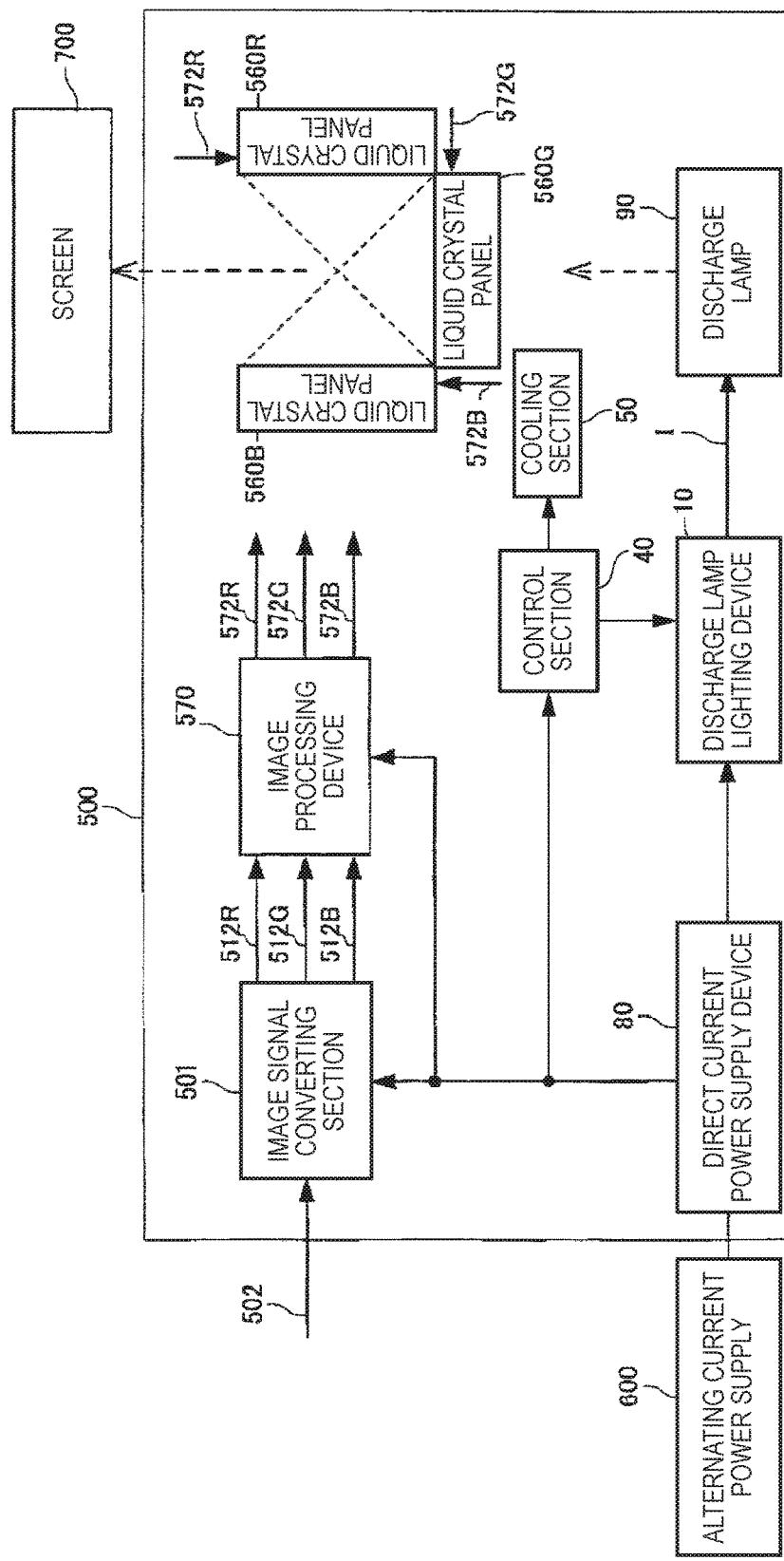
FIG. 6 is a block diagram showing various components of the projector in the first embodiment.

FIG. 6 is a diagram showing an example of the circuit configuration of the projector 500 in this embodiment. The projector 500 includes, besides the components shown in FIG. 1, as shown in FIG. 6, an image signal converting section 501, the direct current power supply device 80, the liquid crystal panels 560R, 560G, and 560B, and an image processing device 570.

The image signal converting section 501 converts an image signal (image information) 502 (a luminance color difference signal, an analog RGB signal, etc.) input from the outside into a digital RGB signal having a predetermined word length to generate image signals (image information) 512R, 512G, and 512B and supplies the image signals (the image information) 512R, 512G, and 512B to the image processing device 570.

The image processing device 570 performs image processing respectively on the three image signals 512R, 512G, and 512B. The image processing device 570 supplies driving signals 572R, 572G, and 572B for respectively driving the liquid crystal panels 560R, 560G, and 560B to the liquid crystal panels 560R, 560G, and 560B.

The direct current power supply device 80 converts an alternating current voltage supplied from an external alternating current power supply 600 into a constant direct current voltage. The direct current power supply device 80 supplies the direct current voltage to the image signal converting section 501 and the image processing section 570 present on a secondary side of a transformer (not shown in the figure; included in the direct current power supply device 80) and the discharge lamp lighting device 10 present on a primary side of the transformer.

The discharge lamp lighting device 10 generates a high voltage between the electrodes of the discharge lamp 90 during a start and causes dielectric breakdown to form a discharge path. Thereafter, the discharge lamp lighting device 10 supplies the driving current I for the discharge lamp 90 to maintain electric discharge.

The liquid crystal panels 560R, 560G, and 560B are respectively provided in the liquid crystal light valves 330R, 330G, and 330B explained above. The liquid crystal panels 560R, 560G, and 560B respectively modulate, on the basis of the driving signals 572R, 572G, and 572B, transmittances (luminances) of color lights made incident on the liquid crystal panels 560R, 560G, and 560B via the optical system explained above.

Control of the cooling section 50 by the control section 40 in this embodiment is explained. In this embodiment, the control section 40 controls the cooling section 50 according to PWM control. The control section 40 modulates a duty ratio of a current pulse supplied to the cooling section 50 and adjusts a number of revolutions Rf of the cooling section 50. The duty ratio of the current pulse supplied to the cooling section 50 is in a proportional relation with the number of revolutions Rf of the cooling section 50. That is, the number of revolutions Rf of the cooling section 50 in the following explanation can be replaced with a duty ratio of the current pulse supplied to the cooling section 50.

Figure 7:
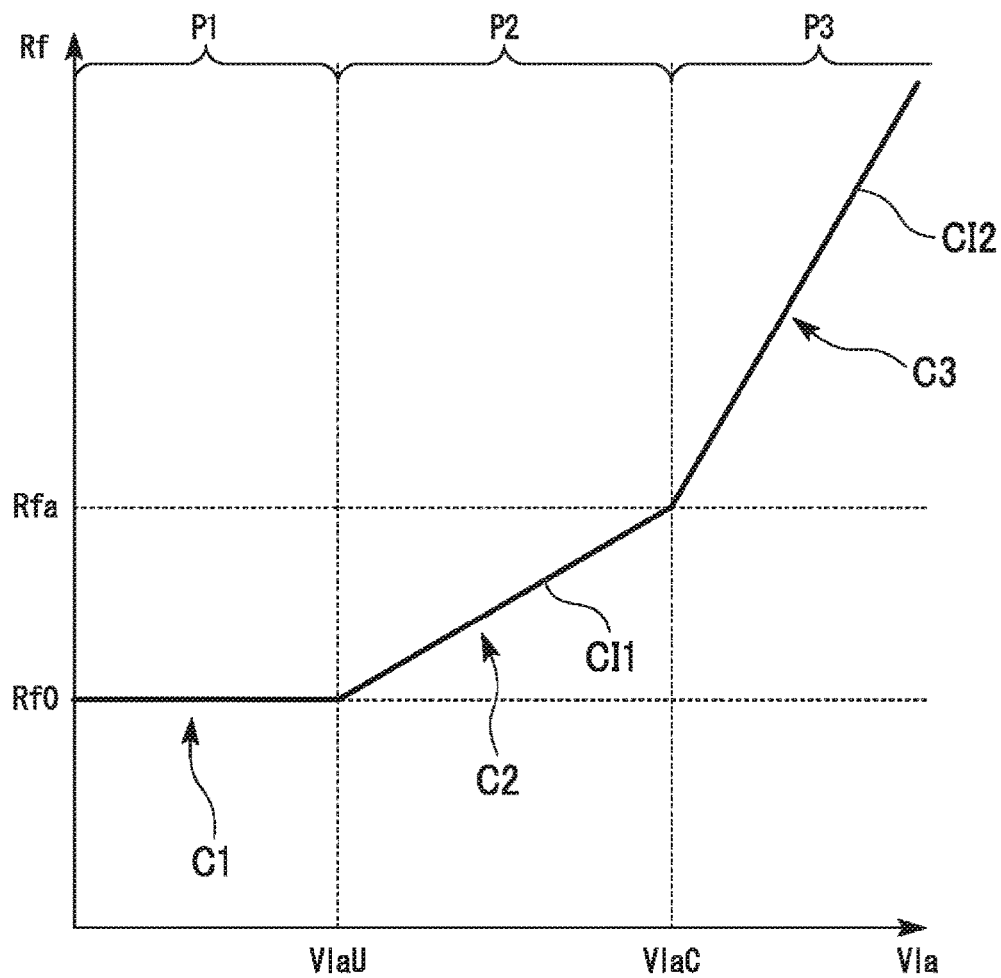
FIG. 7 is a graph showing an example of a change in the number of revolutions of a cooling section with respect to a change in a lamp voltage in the first embodiment.
Figure 8:
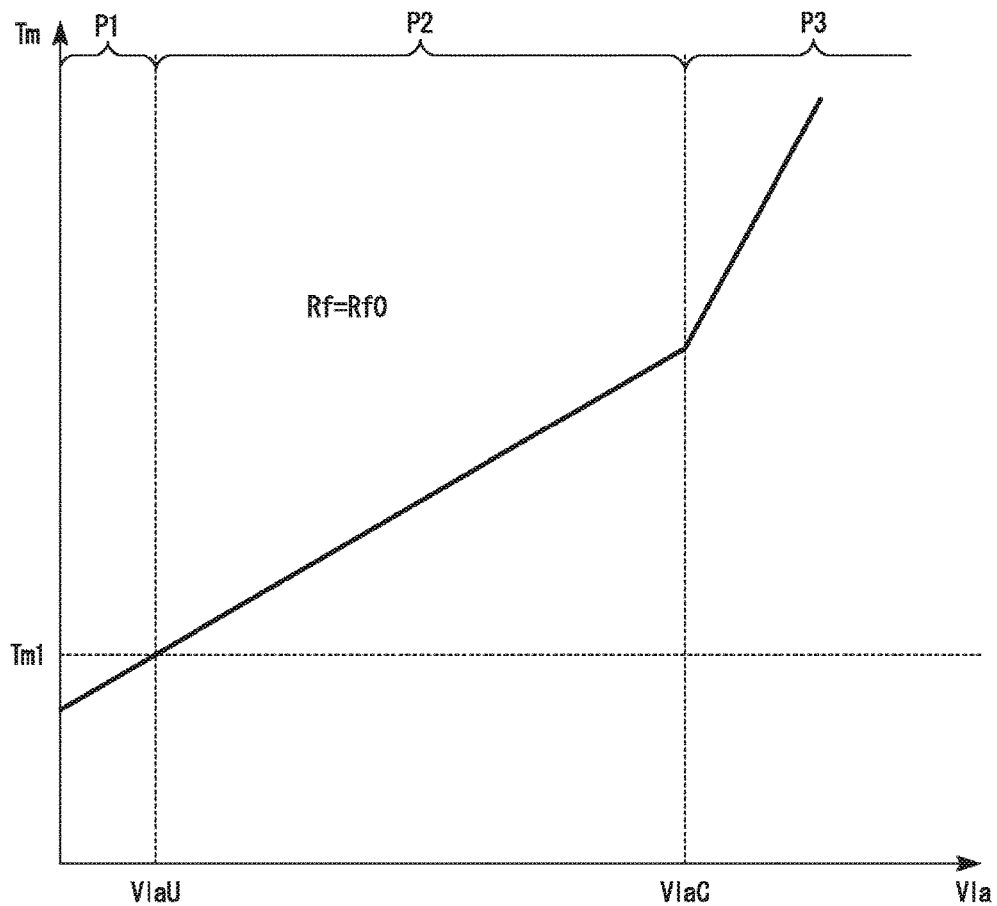
FIG. 8 is a graph showing an example of a change in a discharge lamp temperature in the discharge lamp with respect to the change in the lamp voltage.

FIG. 7 is a graph showing an example of a change in the number of revolutions Rf of the cooling section 50 with respect to a change in the lamp voltage Vla in this embodiment. In FIG. 7, the vertical axis indicates the number of revolutions Rf of the cooling section 50 and the horizontal axis indicates the lamp voltage Vla. FIG. 8 is a graph showing an example of a change in a discharge lamp temperature Tm in the discharge lamp 90 with respect to the change in the lamp voltage Vla. In FIG. 8, the vertical axis indicates the discharge lamp temperature Tm and the horizontal axis indicates the lamp voltage Vla. In this embodiment, the discharge lamp temperature Tm is the temperature of the top section 510a of the discharge lamp main body 510.

As shown in FIG. 7, the control section 40 is capable of executing first cooling control C1, second cooling control C2, and third cooling control C3. In the example shown in FIG. 7, the first cooling control C1 is executed in a first voltage range P1 in which the lamp voltage Vla is equal to or smaller than an initial upper limit value (a first voltage value) VlaU. The second cooling control C2 is executed in a second voltage range P2 in which the lamp voltage Vla is larger than the initial upper limit value VlaU and smaller than a devitrification occurrence value VlaC. The third cooling control C3 is executed in a third voltage range P3 in which the lamp voltage Vla is equal to or larger than the devitrification occurrence value VlaC.

The initial upper limit value VlaU is an upper limit value of variation of an initial lamp voltage Vla0 of the discharge lamp 90. The initial lamp voltage Vla0 varies from an initial lower limit value VlaL, which is a lower limit value of the variation of the initial lamp voltage Vla0, to an initial upper limit value VlaU according to manufacturing variation of the discharge lamp 90. As an example, when a target value of the initial lamp voltage Vla0 is set to 65 V, the initial upper limit value VlaU is 75 V and the initial lower limit value VlaL is 60 V.

The devitrification occurrence value VlaC is the lamp voltage Vla at the time when devitrification starts to occur in the discharge lamp 90. The devitrification is a phenomenon in which the inner wall of the discharge lamp main body 510 of the discharge lamp 90 is heated to be crystallized and clouded. When the discharge lamp 90 is devitrified, the illuminance (light emission efficiency) of the discharge lamp 90 decreases. The devitrification occurrence value VlaC is larger than the initial upper limit value VlaU.

The first cooling control C1 is control in which the number of revolutions Rf of the cooling section 50 does not depend on the lamp voltage Vla. That is, when performing the first cooling control C1, the control section 40 performs control of the number of revolutions Rf of the cooling section 50 not on the basis of the lamp voltage Vla. In this embodiment, the number of revolutions Rf of the cooling section 50 in the first cooling control C1 is constant. That is, the control section 40 maintains the number of revolutions Rf of the cooling section 50 at a constant value in the first voltage range P1 in which the first cooling control C1 is performed. In the example shown in FIG. 7, the number of revolutions Rf of the cooling section 50 is maintained at a specification number of revolutions Rf0 in the first cooling control C1. The specification number of revolutions Rf0 is the number of revolutions Rf of the cooling section 50 with which the discharge lamp temperature Tm can be set to a suitable value at an initial stage of use of the discharge lamp 90 when the initial lamp voltage Vla0 is the target value.

The second cooling control C2 is a control for controlling the cooling section 50 on the basis of first control information (control information) CI1 indicating a relation between the lamp voltage Vla and the number of revolutions Rf of the cooling section 50. In this embodiment, the relation between the lamp voltage Vla and the number of revolutions Rf of the cooling section 50 indicated by the first control information CI1 is indicated by a linear function. A slope of the number of revolutions Rf of the cooling section 50 with respect to the lamp voltage Vla in the first control information CI1 is positive. That is, in the first control information CI1, the number of revolutions Rf of the cooling section 50 is set to be larger along a linear straight line as the lamp voltage Vla is larger.

The first control information CI1 can be experimentally obtained by measuring a relation between the lamp voltage Vla and the discharge lamp temperature Tm at each number of revolutions Rf of the cooling section 50 when the lamp voltage Vla is smaller than the devitrification occurrence value VlaC, that is, in the first voltage range P1 and the second voltage range P2. In FIG. 8, an example of a change in the discharge lamp temperature Tm with respect to a change in the lamp voltage Vla at the time when the number of revolutions Rf of the cooling section 50 is set constant at the specification number of revolutions Rf0 in the first voltage range P1 and the second voltage range P2 is shown. As shown in FIG. 8, in the first voltage range P1 and the second voltage range P2, the change in the discharge lamp temperature Tm with respect to the lamp voltage Vla is represented by a linear function, a slope of which is positive. That is, when the lamp voltage Vla rises because of some cause in the first voltage range P1 and the second voltage range P2, the discharge lamp temperature Tm rises according to a linear straight line corresponding to the number of revolutions Rf of the cooling section 50.

Note that the researches of the inventors clarified that the relation between the discharge lamp temperature Tm and the lamp voltage Vla in the first voltage range P1 and the second voltage range P2 is represented by such a linear function. A slope and an intercept of the linear function can be experimentally calculated for each discharge lamp.

The first control information CI1 is obtained by obtaining, from the relation between the discharge lamp temperature Tm and the lamp voltage Vla at each number of revolutions Rf of the cooling section 50 explained above, the number of revolutions Rf for each lamp voltage Vla at the time when the discharge lamp temperature Tm is set to a desired value. In this embodiment, the first control information CI1 is obtained by obtaining the number of revolutions Rf at each lamp voltage Vla at the time when the discharge lamp temperature Tm is maintained at a constant proper temperature Tm1. As an example, it is seen from the graph of FIG. 8 that, when the lamp voltage Vla is the initial upper limit value VlaU, the discharge lamp temperature Tm can be set to the proper temperature Tm1 by setting the number of revolutions Rf of the cooling section 50 to the specification number of revolutions Rf0.

The control section 40 performs the second cooling control C2 based on the first control information CI1 in the second voltage range P2. Therefore, it is possible to maintain the discharge lamp temperature Tm at the proper temperature Tm1 in the second voltage range P2. As shown in FIG. 7, in the first control information CI1 in this embodiment, the number of revolutions Rf of the cooling section 50 at the time when the lamp voltage Vla is the initial upper limit value VlaU is the specification number of revolutions Rf0. In the first control information CI1 in this embodiment, the number of revolutions Rf of the cooling section 50 at the time when the lamp voltage Vla is the devitrification occurrence value VlaC is a number of revolutions Rfa. The number of revolutions Rf of the cooling section 50 in the first cooling control C1 is equal to or smaller than the number of revolutions Rf of the cooling section 50 in the second cooling control C2.

The third cooling control C3 is control for controlling the cooling section 50 on the basis of second control information (control information) CI2 indicating the relation between the lamp voltage Vla and the number of revolutions Rf of the cooling section 50. In this embodiment, the relation between the lamp voltage Vla and the number of revolutions Rf of the cooling section 50 indicated by the second control information CI2 is indicated by a linear function. A slope of the number of revolutions Rf of the cooling section 50 with respect to the lamp voltage Vla in the second control information CI2 is positive. That is, in the second control information CI2, the number of revolutions Rf of the cooling section 50 is set to be larger along a linear straight line as the lamp voltage Vla is larger.

A degree of the number of revolutions Rf of the cooling section 50 corresponding to the lamp voltage Vla in the second control information CI2 is larger than a degree of the number of revolutions Rf of the cooling section 50 corresponding to the lamp voltage Vla in the first control information CI1. Note that, in this specification, "a degree of the number of revolutions of the cooling section corresponding to the lamp voltage" includes a value of the number of revolutions of the cooling section corresponding to the lamp voltage and a ratio of a change amount of the number of revolutions of the cooling section with respect to a change amount of the lamp voltage.

In this embodiment, a ratio of a change amount of the number of revolutions Rf of the cooling section 50 with respect to a change amount of the lamp voltage Vla in the second control information CI2 is larger than a ratio of a change amount of the number of revolutions Rf of the cooling section 50 with respect to a change amount of the lamp voltage Vla in the first control information CI1. In other words, a slope of a change in the number of revolutions Rf of the cooling section 50 in the second control information CI2 shown in FIG. 7 is larger than a slope of a change in the number of revolutions Rf of the cooling section 50 in the first control information CI1. The ratio of the change amount of the number of revolutions Rf of the cooling section 50 with respect to the change amount of the lamp voltage Vla in the second control information CI2 is larger than one times, smaller than three times, and desirably equal to or smaller than two times the ratio of the change amount of the number of revolutions Rf of the cooling section 50 with respect to the change amount of the lamp voltage Vla in the first control information CI1. By setting such a numerical value range, it is easy to suitably perform the control of the cooling section 50 by the third cooling control C3.

In the second control information CI2 in this embodiment, the number of revolutions Rf of the cooling section 50 at the time when the lamp voltage Vla is the devitrification occurrence value VlaC is the number of revolutions Rfa as in the first control information CI1. The number of revolutions Rf of the cooling section 50 in the second cooling control C2 is equal to or smaller than the number of revolutions Rf of the cooling section 50 in the third cooling control C3.

The control section 40 switches the respective cooling controls on the basis of the lamp voltage Vla and a cumulative lighting time tt.

Figure 9:
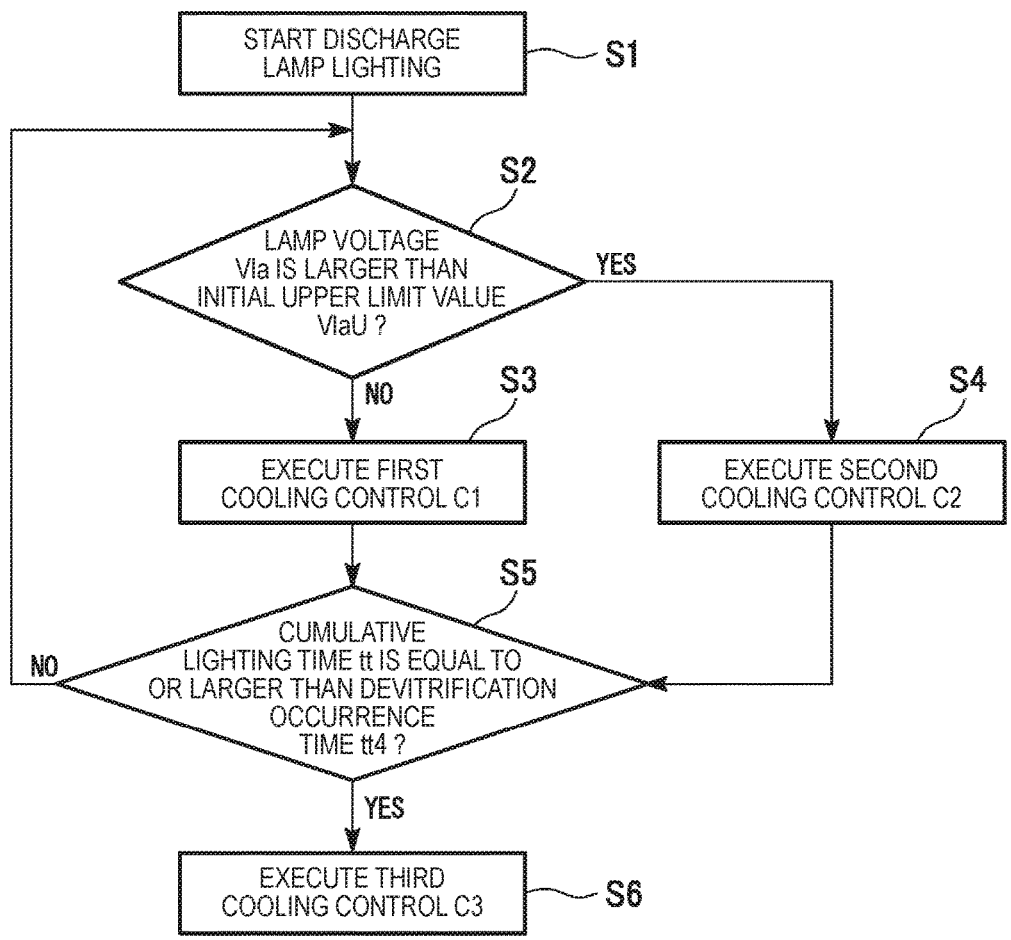
FIG. 9 is a flowchart for explaining an example of a control procedure of the control section in the first embodiment.
Figure 10:
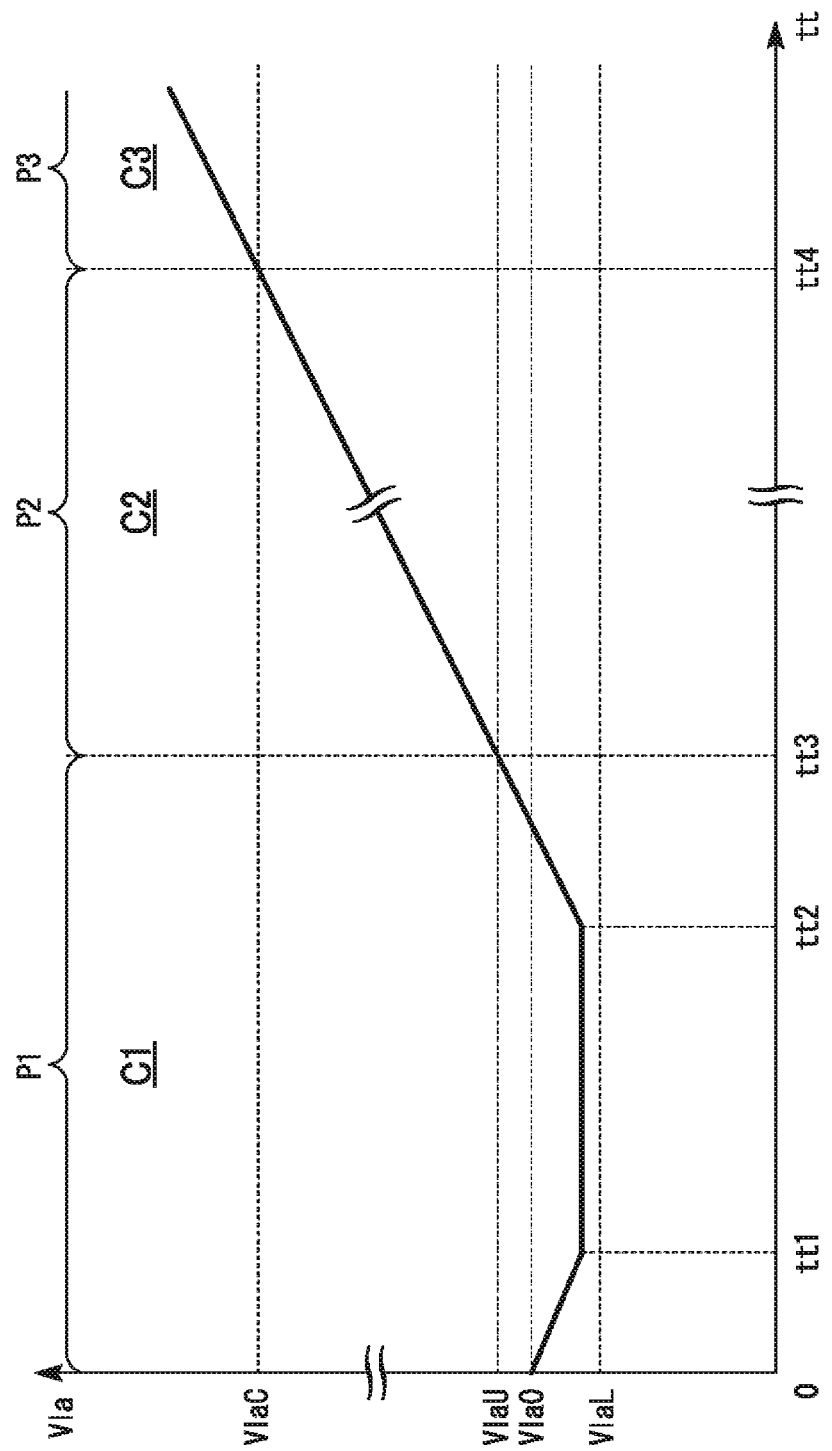
FIG. 10 is a graph showing an example of a change in the lamp voltage with respect to a change in a cumulative lighting time.

FIG. 9 is a flowchart for explaining an example of a control procedure of the control section 40 in this embodiment. FIG. 10 is a graph showing an example of a change in the lamp voltage Vla with respect to a change in the cumulative lighting time tt. In FIG. 10, the vertical axis indicates the lamp voltage Vla and the horizontal axis indicates the cumulative lighting time tt. The cumulative lighting time tt is a total of times in which the discharge lamp 90 is lit. That is, the cumulative lighting time tt is a lighting time of the discharge lamp 90 integrated from the time when the discharge lamp 90 is lit for the first time.

As shown in FIG. 9, when the discharge lamp 90 starts lighting (step S1), the control section 40 determines whether the lamp voltage Vla is larger than the initial upper limit value VlaU (the first voltage value) (step S2). When the lamp voltage Vla is equal to or smaller than the initial upper limit value VlaU (NO in step S2), the control section 40 executes the first cooling control C1 (step S3). On the other hand, when the lamp voltage Vla is larger than the initial upper limit value VlaU (YES in step S2), the control section 40 executes the second cooling control C2 (step S4). That is, when the lamp voltage Vla is larger than the initial upper limit value VlaU (the first voltage value), the control section 40 switches the control of the cooling section 50 from the first cooling control C1 to the second cooling control C2.

The control section 40 determines whether the cumulative lighting time tt is equal to or larger than a devitrification occurrence time (a predetermined value) tt4 while executing the first cooling control C1 or the second cooling control C2 (step S5). The devitrification occurrence time tt4 is the cumulative lighting time tt when devitrification starts to occur in the discharge lamp 90. For example, the devitrification occurrence time tt4 is experimentally calculated and stored in the storing section 44 in advance. Note that the devitrification occurrence time tt4 can also be estimated from an integrated value of the discharge lamp temperature Tm. In this case, the control section 40 may estimate the devitrification occurrence time tt4 from a change in the discharge lamp temperature Tm while performing the first cooling control C1 or the second cooling control C2.

When the cumulative lighting time tt is smaller than the devitrification occurrence time tt4 (NO in step S5), the control section 40 determines that devitrification does not occur in the discharge lamp 90. The control section 40 executes the first cooling control C1 or the second cooling control C2 (steps S3 and S4) while determining whether the lamp voltage Vla is larger than the initial upper limit value VlaU (step S2). On the other hand, when the cumulative lighting time tt is equal to or larger than the devitrification occurrence time tt4 (YES in step S5), the control section 40 determines that devitrification occurs in the discharge lamp 90 and executes the third cooling control C3 (step S6). That is, when determining that devitrification occurs in the discharge lamp 90, the control section 40 switches the control of the cooling section 50 from the first cooling control C1 or the second cooling control C2 to the third cooling control C3. Thereafter, the control section 40 continues to execute the third cooling control C3.

As shown in FIG. 10, for example, the lamp voltage Vla gradually decreases at an initial stage when the cumulative lighting time tt is relatively small. This is because, at the initial stage, the protrusion 531p easily extends and the inter-electrode distance between the first electrode 92 and the second electrode 93 easily decreases. In the example shown in FIG. 10, the initial lamp voltage Vla0 is a value between the initial lower limit value VlaL and the initial upper limit value VlaU. The lamp voltage Vla decreases until the cumulative lighting time tt reaches a value tt1. At a point in time when the cumulative lighting time tt reaches the value tt1, the lamp voltage Vla is smaller than the initial lamp voltage Vla0 and larger than the initial lower limit value VlaL.

Thereafter, the lamp voltage Vla is maintained at a decreased value or in the vicinity of the decreased value. When the cumulative lighting time tt is relatively large, the lamp voltage Vla starts to gradually increase. In the example shown in FIG. 10, when the cumulative lighting time tt is equal to or larger than a value tt2 larger than the value tt1, the lamp voltage Vla starts to increase. After the lamp voltage Vla starts to increase, when the cumulative lighting time tt reaches a switching time (a first time) tt3 larger than the value tt2, the lamp voltage Vla reaches the initial upper limit value VlaU. Thereafter, the lamp voltage Vla continues to increase according to an increase in the cumulative lighting time tt.

In the example shown in FIG. 10, a range in which the cumulative lighting time tt is equal to or smaller than the switching time tt3 is the first voltage range P1 in which the lamp voltage Vla is equal to or smaller than the initial upper limit value VlaU. A range in which the cumulative lighting time tt is larger than the switching time tt3 and smaller than the devitrification occurrence time tt4 is the second voltage range P2 in which the lamp voltage Vla is larger than the initial upper limit value VlaU and smaller than the devitrification occurrence value VlaC. A range in which the cumulative lighting time tt is equal to or larger than the devitrification occurrence time tt4 is the third voltage range P3 in which the lamp voltage Vla is equal to or larger than the devitrification occurrence value VlaC.

In this embodiment, for example, since the lamp voltage Vla changes as explained above, when the cumulative lighting time tt is equal to or smaller than the switching time tt3, the control section 40 executes the first cooling control C1. When the lamp voltage Vla is larger than the initial upper limit value VlaU, that is, when the cumulative lighting time tt is larger than the switching time tt3, the control section 40 switches the control of the cooling section 50 from the first cooling control C1 to the second cooling control C2. Thereafter, since the lamp voltage Vla continues to rise, the control section 40 continues to execute the second cooling control C2 until the cumulative lighting time tt reaches the devitrification occurrence time tt4. When the cumulative lighting time tt is equal to or larger than the devitrification occurrence time tt4, the control section 40 switches the control of the cooling section 50 from the second cooling control C2 to the third cooling control C3.

As explained above, the control section 40 switches between the first cooling control C1, the second cooling control C2, and the third cooling control C3, and controls the cooling section 50.

The control by the control section 40 explained above can be represented as a control method for the projector as well. That is, a control method for the projector 500 in this embodiment is a control method for the projector 500 including the discharge lamp 90 including a pair of the first electrode 92 and the second electrode 93 and configured to emit light and the cooling section 50 configured to cool the discharge lamp 90. The control method includes executing the first cooling control C1 in which the number of revolutions Rf of the cooling section 50 does not depend on the lamp voltage Vla of the discharge lamp 90 and the second cooling control C2 for controlling the cooling section 50 on the basis of the first control information CI1 indicating a relation between the lamp voltage Vla and the number of revolutions Rf of the cooling section 50. The number of revolutions Rf of the cooling section 50 in the first cooling control C1 is equal to or smaller than the number of revolutions Rf of the cooling section 50 in the second cooling control C2. When the lamp voltage Vla is larger than the initial upper limit value VlaU, the control of the cooling section is switched from the first cooling control C1 to the second cooling control C2.

The control method for the projector 500 is a control method for the projector 500 including the discharge lamp 90 including a pair of the first electrode 92 and the second electrode 93 and configured to emit light and the cooling section 50 configured to cool the discharge lamp 90. The control method includes controlling the cooling section 50 on the basis of the control information (the first control information CI1 and the second control information CI2) indicating a relation between the lamp voltage Vla of the discharge lamp 90 and the number of revolutions Rf of the cooling section 50 and, when determining that devitrification occurs in the discharge lamp 90, increasing a degree of the number of revolutions Rf of the cooling section 50 corresponding to the lamp voltage Vla in the control information.

For example, it is assumed that the cooling section 50 is controlled by only the second cooling control C2 explained above. In this case, immediately after the discharge lamp 90 starts to be used, the number of revolutions Rf of the cooling section 50 changes according to the lamp voltage Vla. In this case, for example, when the initial lamp voltage Vla0 is the initial upper limit value VlaU, the number of revolutions Rf of the cooling section 50 is large compared with when the initial lamp voltage Vla0 is the target value. Since blackening easily occurs in the discharge lamp 90 at the initial stage, when the number of revolutions Rf of the cooling section 50 increases at the initial stage, blackening sometimes more easily occurs. When the blackening occurs, the temperature of a portion where the blackening occurs rises and devitrification easily occurs. Therefore, in the case explained above, in some case, devitrification occurs at the initial stage and the life of the discharge lamp 90 decreases.

On the other hand, according to this embodiment, when the lamp voltage Vla is larger than the initial upper limit value VlaU, the control section 40 switches the control of the cooling section 50 from the first cooling control C1 to the second cooling control C2. That is, when the lamp voltage Vla is equal to or smaller than the initial upper limit value VlaU, the control section 40 executes the first cooling control C1 which does not depend on the lamp voltage Vla and in which the number of revolutions Rf is equal to or smaller than the number of revolutions Rf of the cooling section 50 in the second cooling control C2. Therefore, it is possible to control the number of revolutions Rf of the cooling section 50 at the initial stage irrespective of variation of the initial lamp voltage Vla0. It is possible to prevent the number of revolutions Rf of the cooling section 50 from increasing. Consequently, it is possible to prevent blackening and devitrification from occurring in the discharge lamp 90 at the initial stage.

When the discharge lamp 90 is lit for a certain degree of time and the cumulative lighting time tt increases to a certain degree, blackening less easily occurs. When the discharge lamp 90 is in such as state, it is desirable to perform the second cooling control C2 for changing the number of revolutions Rf of the cooling section 50 according to the lamp voltage Vla. This is because, by maintaining the discharge lamp temperature Tm at the proper temperature Tm1, it is possible to prevent an integrated value of the discharge lamp temperature Tm from increasing and it is possible to extend the devitrification occurrence time tt4 until occurrence of devitrification.

On the other hand, in this embodiment, when the lamp voltage Vla is larger than the initial upper limit value VlaU, the control of the cooling section 50 is switched from the first cooling control C1 to the second cooling control C2. Therefore, after the cumulative lighting time tt elapses to a certain degree, it is possible to suitably switch the control of the cooling section 50. Therefore, when the lamp voltage Vla is larger than the initial upper limit value VlaU, it is possible to suitably cool the discharge lamp 90.

As explained above, according to this embodiment, it is possible to obtain the projector 500 capable of appropriately cooling the discharge lamp 90 irrespective of the manufacturing variation of the discharge lamp 90. Consequently, it is possible to improve the life of the discharge lamp 90.

Note that, as explained above, at the initial stage of the discharge lamp 90, the protrusion 531p easily extends and the lamp voltage Vla decreases. Therefore, for example, even when the initial lamp voltage Vla0 is the initial upper limit value VlaU, the lamp voltage Vla is prevented from immediately becoming larger than the initial upper limit value VlaU at the initial stage. Consequently, it is possible to suitably execute the first cooling control C1 at the initial stage.

For example, when the cooling section 50 is controlled only by the second cooling control C2 explained above and the initial lamp voltage Vla0 is relatively large, the number of revolutions Rf of the cooling section 50 is relatively large. Therefore, noise caused by the cooling section 50 increases immediately after the projector 500 starts to be used.

On the other hand, according to this embodiment, it is possible to prevent the number of revolutions Rf of the cooling section 50 from increasing at the initial stage irrespective of variation of the initial lamp voltage Vla0. Therefore, it is possible to prevent noise caused by the cooling section 50 from increasing immediately after the projector 500 starts to be used.

According to this embodiment, the control section 40 sets the number of revolutions Rf of the cooling section 50 to a constant value in the first cooling control C1. Therefore, at the initial stage of the discharge lamp 90, it is easy to maintain the number of revolutions Rf of the cooling section 50 at a value for less easily causing blackening.

According to this embodiment, a relation between the lamp voltage Vla and the number of revolutions Rf indicated by the first control information CI1 is indicated by a linear function. Therefore, by controlling the number of revolutions Rf of the cooling section 50 on the basis of the first control information CI1, it is possible to maintain the discharge lamp temperature Tm, which changes in a linear function manner with respect to the lamp voltage Vla, at a constant value. Consequently, it is possible to maintain the discharge lamp temperature Tm at the proper temperature Tm1 according to the second cooling control C2. It is possible to further improve the life of the discharge lamp 90.

For example, when light emitted from the arc AR is irradiated on the portion of the devitrified discharge lamp main body 510, the irradiated light scatters and a part of the irradiated light is absorbed by the portion of the devitrified discharge lamp main body 510. Therefore, the illuminance of the discharge lamp 90 decreases and the temperature of the portion of the devitrified discharge lamp main body 510 rises with the light emitted from the arc AR. Consequently, in the discharge lamp 90 after the occurrence of the devitrification, the discharge lamp temperature Tm changes according to both of the temperature rise due to the increase in the lamp voltage Vla and the temperature rise due to the devitrification. Therefore, the discharge lamp 90 sometimes cannot be suitably cooled by the second cooling control C2 in which the first control information CI1 based on the changes in the discharge lamp temperature Tm with respect to the lamp voltage Vla in the first voltage range P1 and the second voltage range P2 is used.

On the other hand, according to this embodiment, when determining that devitrification occurs in the discharge lamp 90, the control section 40 switches the control of the cooling section 50 to the third cooling control C3 for controlling the cooling section 50 on the basis of the second control information CI2 in which a degree of the number of revolutions Rf of the cooling section 50 corresponding to the lamp voltage Vla is larger than the degree in the first control information CI1. In other words, when determining that devitrification occurs in the discharge lamp 90, the control section 40 increases the degree of the number of revolutions Rf of the cooling section 50 corresponding to the lamp voltage Vla in the control information. Therefore, after the devitrification occurs in the discharge lamp 90, it is possible to increase a cooling degree of the discharge lamp 90. It is possible to suitably cool the discharge lamp 90. Therefore, according to this embodiment, it is possible to obtain the projector 500 capable of appropriately cooling the discharge lamp 90 even when devitrification occurs. Consequently, it is possible to further improve the life of the discharge lamp 90.

For example, after the devitrification occurs, a degree of the devitrification increases together with deterioration of the discharge lamp 90, that is, a rise in the lamp voltage Vla. Therefore, a change amount of the discharge lamp temperature Tm is larger with respect to a change amount of the lamp voltage Vla than before the devitrification occurs. A change in the discharge lamp temperature Tm with respect to the lamp voltage Vla after the occurrence of the devitrification (in the third voltage range P3) is considered to be a linear function, a slope of which is larger than a change in the discharge lamp temperature Tm with respect to the lamp voltage Vla before the occurrence of the devitrification (in the first voltage range P1 and the second voltage range P2), for example, as shown in FIG. 8.

On the other hand, according to this embodiment, a relation between the lamp voltage Vla indicated by the second control information CI2 and the number of revolutions Rf of the cooling section 50 is indicated by a linear function. A ratio of a change amount of the number of revolutions Rf of the cooling section 50 to a change amount of the lamp voltage Vla in the second control information CI2 is larger than a ratio of a change amount of the number of revolutions Rf of the cooling section 50 to a change amount of the lamp voltage Vla in the first control information CI1. In other words, when determining that devitrification occurs in the discharge lamp 90, the control section 40 increases a ratio of a change amount of the number of revolutions Rf of the cooling section 50 to a change amount of the lamp voltage Vla in the control information. Consequently, it is easy to suitably change the number of revolutions Rf of the cooling section 50 to offset a change in the discharge lamp temperature Tm caused by a change in the lamp voltage Vla after the occurrence of the devitrification. It is easy to set the discharge lamp temperature Tm to a suitable value. Therefore, it is possible to further improve the life of the discharge lamp 90.

According to this embodiment, the ratio of the change amount of the number of revolutions Rf of the cooling section 50 to the change amount of the lamp voltage Vla in the second control information CI2 is larger than one times and smaller than three times the ratio of the change amount of the number of revolutions Rf of the cooling section 50 to the change amount of the lamp voltage Vla in the first control information CI1. In other words, when determining that devitrification occurs in the discharge lamp 90, the control section 40 increases, within a range smaller than three times, the ratio of the change amount of the number of revolutions Rf of the cooling section 50 to the change amount of the lamp voltage Vla in the control information. Consequently, it is easily to more suitably cool the discharge lamp 90 after the occurrence of the devitrification. It is possible to further improve the life of the discharge lamp 90.

According to this embodiment, when the cumulative lighting time tt is equal to or larger than the devitrification occurrence time (the predetermined value) tt4, the control section 40 determines that devitrification occurs in the discharge lamp 90. Therefore, the control section 40 can easily detect devitrification by using the devitrification occurrence time tt4 experimentally calculated in advance or estimating the devitrification occurrence time tt4 as explained above. Therefore, when devitrification occurs in the discharge lamp 90, it is possible to suitably switch the control of the cooling section 50 (cooling control) to the third cooling control C3.

Second Embodiment

Figure 11:
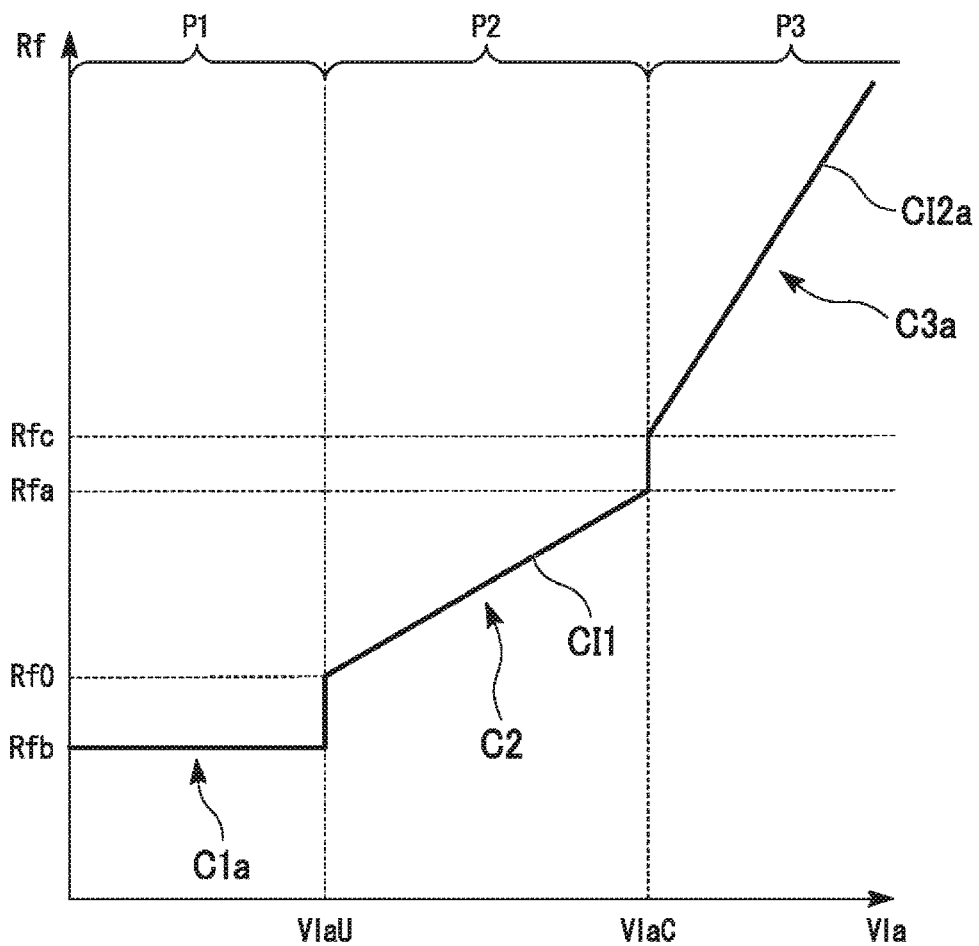
FIG. 11 is a graph showing an example of a change in the number of revolutions of a cooling section with respect to a change in a lamp voltage in a second embodiment.

A second embodiment is different from the first embodiment in a way of a change in the number of revolutions Rf of the cooling section 50 with respect to the lamp voltage Vla. FIG. 11 is a graph showing an example of a change in the number of revolutions Rf of the cooling section 50 with respect to a change in the lamp voltage Vla in this embodiment. In FIG. 11, the vertical axis indicates the number of revolutions Rf of the cooling section 50 and the horizontal axis indicates the lamp voltage Vla. Note that the same components as the components in the first embodiment are sometimes denoted by the same reference numerals and signs as appropriate to omit explanation of the components.

The number of revolutions Rf of the cooling section 50 in first cooling control C1a in this embodiment is smaller than the number of revolutions Rf of the cooling section 50 at the time when the lamp voltage Vla is the initial upper limit value VlaU in the second cooling control C2. In this embodiment, the number of revolutions Rf of the cooling section 50 in the first cooling control C1a is constant at a low number of revolutions Rfb smaller than the specification number of revolutions Rf0.

In the first cooling control C1a, since the number of revolutions Rf of the cooling section 50 is the low number of revolutions Rfb, the discharge lamp temperature Tm is larger than the proper temperature Tm1. The low number of revolutions Rfb is desirably set such that the discharge lamp temperature Tm is a value larger than the proper temperature Tm1 by 30° or less in the first voltage range P1. Consequently, it is possible to prevent the devitrification occurrence time tt4 until occurrence of devitrification from decreasing.

In third cooling control C3a in this embodiment, the cooling section 50 is controlled on the basis of second control information CI2a. In the second control information CI2a, the number of revolutions Rf of the cooling section 50 at the time when the lamp voltage Vla is the devitrification occurrence value VlaC is a high number of revolutions Rfc larger than the number of revolutions Rfa of the cooling section 50 at the time when the lamp voltage Vla in the first control information CI1 is the devitrification occurrence value VlaC.

A degree of the number of revolutions Rf of the cooling section 50 corresponding to the lamp voltage Vla in the second control information CI2a in this embodiment is larger than a degree of the number of revolutions Rf of the cooling section 50 corresponding to the lamp voltage Vla in the second control information CI2 in the first embodiment. A slope of the number of revolutions Rf of the cooling section 50 with respect to the lamp voltage Vla in the second control information CI2a in this embodiment is the same as, for example, a slope of the number of revolutions Rf of the cooling section 50 with respect to the lamp voltage Vla in the second control information CI2 in the first embodiment.

In this embodiment, when the lamp voltage Vla is larger than the initial upper limit value VlaU, the control section 40 increases the number of revolutions Rf of the cooling section 50. Specifically, the control section 40 increases the number of revolutions Rf of the cooling section 50 from the low number of revolutions Rfb to the specification number of revolutions Rf0. When determining that devitrification occurs in the discharge lamp 90, the control section 40 increases the number of revolutions Rf of the cooling section 50. Specifically, when the cumulative lighting time tt reaches the devitrification occurrence time tt4, the control section 40 increases the number of revolutions Rf of the cooling section 50 from the number of revolutions Rfa to the high number of revolutions Rfc. The other configurations and the other methods are the same as the configurations and the methods in the first embodiment.

For example, when the initial lamp voltage Vla0 is smaller than a target value because of the manufacturing variation of the discharge lamp 90 and the number of revolutions Rf of the cooling section 50 is set to the specification number of revolutions Rf0 in the first cooling control, a cooling degree of the discharge lamp 90 increases and blackening sometimes easily occurs.

On the other hand, according to this embodiment, the number of revolutions Rf of the cooling section 50 in the first cooling control C1a is smaller than the number of revolutions Rf of the cooling section 50 at the time when the lamp voltage Vla is the initial upper limit value VlaU in the second cooling control C2. Therefore, at the initial stage of the discharge lamp 90, it is possible to further reduce the number of revolutions Rf of the cooling section 50. Even when the initial lamp voltage Vla0 is smaller than the target value because of the manufacturing variation of the discharge lamp 90, it is possible to prevent blackening from occurring. Further, it is possible to further reduce noise caused by the cooling section 50.

According to this embodiment, when determining that devitrification occurs in the discharge lamp 90, the control section 40 increases the number of revolutions Rf of the cooling section 50. Therefore, immediately after the devitrification occurs, it is possible to increase the number of revolutions Rf of the cooling section 50 and improve a cooling degree of the discharge lamp 90. Consequently, it is possible to suitably cool the discharge lamp 90.

Note that, in the embodiments explained above, configurations and methods explained below can also be adopted. In the embodiments, the control section 40 performs the switching of the first cooling controls C1 and C1a and the second cooling control C2 on the basis of the lamp voltage Vla. However, the switching of the control is not limited to this. The control section 40 may switch the first cooling controls C1 and C1a and the second cooling control C2 on the basis of the cumulative lighting time tt. In this case, the control section 40 may switch the control of the cooling section 50 from the first cooling controls C1 to C1a to the second cooling control C2, for example, when the cumulative lighting time tt of the discharge lamp 90 is larger than the switching time tt3. That is, when the lamp voltage Vla is larger than the initial upper limit value VlaU (the first voltage value) or when the cumulative lighting time tt of the discharge lamp 90 is larger than the switching time tt3 (the first time), the control section 40 switches the control of the cooling section 50 from the first cooling controls C1 and C1a to the second cooling control C2. The same applies to a control method for the projector.

When the first cooling controls C1 and C1a and the second cooling control C2 are switched on the basis of the cumulative lighting time tt, the number of revolutions Rf of the cooling section 50 in the first cooling control C1a in the second embodiment explained above is smaller than the number of revolutions Rf at the time when the cumulative lighting time tt is the switching time tt3 in the second cooling control C2. That is, the number of revolutions Rf of the cooling section 50 in the first cooling control C1a in the second embodiment is smaller than the number of revolutions Rf of the cooling section 50 at the time when the lamp voltage Vla is the initial upper limit value VlaU in the second cooling control C2 or smaller than the number of revolutions Rf at the time when the cumulative lighting time tt is the switching time tt3 in the second cooling control C2.

In the example explained in the first embodiment, after being switched from the first cooling control C1 to the second cooling control C2, the control shifts to the third cooling control C3 without returning to the first cooling control C1. However, the switching of the control is not limited to this. For example, when the lamp voltage Vla becomes equal to or smaller than the initial upper limit value VlaU again after becoming larger than the initial upper limit value VlaU, the control section 40 switches the control of the cooling section 50 from the second cooling control C2 to the first cooling control C1. Note that, as explained above, when the control section 40 switches the first cooling controls C1 and C1a and the second control C2 on the basis of the cumulative lighting time tt, the control does not return from the second cooling control C2 to the first cooling control C1.

The first cooling controls C1 and C1a may be control for varying the number of revolutions Rf of the cooling section 50 rather than fixing the number of resolution Rf. However, even in this case, the first cooling controls C1 and C1a do not depend on the lamp voltage Vla. The relation between the lamp voltage Vla and the number of revolutions Rf of the cooling section 50 indicated by the first control information CI1 may be indicated by a function other than the liner function. For example, the relation between the lamp voltage Vla and the number of revolutions Rf of the cooling section 50 indicated by the first control information CI1 may be relation in which the number of revolutions Rf of the cooling section 50 changes stepwise with respect to a change in the lamp voltage Vla. The same applies to the second control information CI2 and CI2a.

In the embodiments, the control section 40 determines on the basis of the cumulative lighting time tt whether devitrification occurs. However, a method of determining whether devitrification occurs is not particularly limited. For example, the control section 40 may determine on the basis of a change in the lamp voltage Vla, a change in the protrusion 531p, a change in the light emitted from the discharge lamp 90, or the like whether devitrification occurs.

The control section 40 may be configured not to execute the third cooling controls C3 and C3a. In this case, the control section 40 switches the cooling control between the first cooling controls C1 and C1a and the second cooling control C2 on the basis of the lamp voltage Vla or the cumulative lighting time tt. The control section 40 may be configured not to execute the first cooling controls C1 and C1a. In this case, the control section 40 switches the cooling control between the second cooling control C2 and the third cooling controls C3 and C3a on the basis of whether devitrification occurs.

In the embodiment, the example is explained in which the discharge lamp temperature Tm after the occurrence of the devitrification changes in a linear function manner with respect to the lamp voltage Vla. However, the change in the discharge lamp temperature Tm after the occurrence of the devitrification is not particularly limited.

In the embodiments, the example is explained in which the invention is applied to the projector of a transmission type. However, the invention can also be applied to a projector of a reflection type. The "transmission type" means that a liquid crystal light valve including a liquid crystal panel is a type for transmitting light. The "reflection type" means that the liquid crystal light valve is a type for reflecting light. Note that the light modulating device is not limited to the liquid crystal panel or the like and may be, for example, a light modulating device including a micromirror.

In the embodiments, the example of the projector 500 including the three liquid crystal panels 560R, 560G, and 560B (liquid crystal valves 330R, 330G, and 330B) is explained. However, the invention can also be applied to a projector including only one liquid crystal panel and a projector including four or more liquid crystal panels.

The configurations explained above can be combined as appropriate in a range in which the configurations do not contradict one another.

EXAMPLES

Examples 1 and 2 were compared with comparative examples 1 and 2 to confirm usefulness of this embodiment. A discharge lamp used in the examples was a mercury lamp of rated 200 W. A target value of the initial lamp voltage Vla0 of the discharge lamp was 65 V.

The example 1 was an example in which the control of the cooling section was switched between the first cooling control and the second cooling control. The example 2 was an example in which the control of the cooling section was switched among the first cooling control, the second cooling control, and the third cooling control. The comparative example 1 was a comparative example in which only the first cooling control was executed. The comparative example 2 was a comparative example in which only the second cooling control was executed.

In the first cooling control in the examples, the number of revolutions Rf of the cooling section was maintained constant at 5000 rpm. A relation between the lamp voltage Vla and the number of revolutions Rf of the cooling section indicated by respective kinds of control information of the second cooling control and the third cooling control in the examples was a liner function. A ratio of a change amount of the number of revolutions Rf of the cooling section to a change amount of the lamp voltage Vla in the second control information was a double of a ratio of a change amount of the number of revolutions Rf of the cooling section to a change amount of the lamp voltage Vla in the first control information.

In the examples 1 and 2, the first cooling control and the second cooling control were switched on the basis of the lamp voltage Vla. The initial upper limit value VlaU was 75

V. In the example 2, devitrification was determined on the basis of the cumulative lighting time tt. The cooling control was switched from the first cooling control or the second cooling control to the third cooling control. The devitrification occurrence time tt4 was 2000 h (hours). In the examples 1 and 2 and the comparative examples 1 and 2, the discharge lamp was lit and the lives and devitrification areas of the discharge lamp were measured. The devitrification areas were respectively measured at the time when the cumulative lighting time tt was 6000 h (hours). A result of the measurement is shown in Table 1.

TABLE 1

|  | First cooling control | Second cooling control | Third cooling control | Life of the discharge lamp (h) | A decrease rate of the devitrification area [%] |
|---|---|---|---|---|---|
| Comparative Example 1 | E | U | U | 6000 | — |
| Comparative Example 2 | U | E | U | 7500 | 20 |
| Example 1 | E | E | U | 8000 | 25 |
| Example 2 | E | E | E | 10000 | 50 |

In Table 1, "E" in the cooling controls indicates that the cooling controls are executed and "U" indicates that the cooling controls are not executed. The life [h (hours)] of the discharge lamp is the cumulative lighting time tt until an illuminance maintenance rate of the discharge lamp decreases to 50% or less. The devitrification area is shown as a decrease rate [%] based on the comparative example 1. That is, the decrease rate of the devitrification area indicates how much the devitrification area in the discharge lamp decreases in the comparative example 2 and the examples on the basis of the devitrification area of the discharge lamp in the comparative example 1 at the time when the cumulative lighting time tt is 6000 h. It was confirmed from Table 1 that the lives of the discharge lamp are long and the devitrification areas of the discharge lamp are small in the examples 1 and 2 compared with the comparative examples 1 and 2. Consequently, it was confirmed that the life of the discharge lamp can be improved by combining the first cooling control and the second cooling control. The life of the discharge lamp is long and the devitrification area of the discharge lamp is small in the example 2 compared with the example 1. Consequently, it was confirmed that the life of the discharge lamp can be further improved by combining the third cooling control in addition to the first cooling control and the second cooling control.

The example 3 and the comparative example 3 were compared to confirm usefulness of this embodiment. A discharge lamp used in the examples was a mercury lamp of rated 200 W. The example 3 was an example in which the control of the cooling section was switched between the second cooling control and the third cooling control. The comparative example 3 was a comparative example in which only the second cooling control was executed.

A relation between the lamp voltage Vla and the number of revolutions Rf of the cooling section indicated by respective kinds of control information of the second cooling control and the third cooling control in the examples was a liner function. A ratio of a change amount of the number of revolutions Rf of the cooling section to a change amount of the lamp voltage Vla in the second control information was a double of a ratio of a change amount of the number of revolutions Rf of the cooling section to a change amount of the lamp voltage Vla in the first control information.

In the example 3, devitrification was determined on the basis of the cumulative lighting time tt. The cooling control was switched from the second cooling control to the third cooling control. The devitrification occurrence time tt4 was 2000 h (hours). In the example 3 and the comparative example 3, the discharge lamp was lit and the lives and devitrification areas of the discharge lamp were measured. The devitrification areas were respectively measured at the time when the cumulative lighting time tt was 6000 h (hours). A result of the measurement is shown in Table 2.

TABLE 2

|  | Second cooling control | Third cooling control | Life of the discharge lamp (h) | A decrease rate of the devitrification area [%] |
|---|---|---|---|---|
| Comparative example 3 | E | U | 7500 | — |
| Example 3 | E | E | 10000 | 25 |

In Table 2, "E" in the cooling controls indicates that the cooling controls are executed and "U" indicates that the cooling controls are not executed. The life [h (hours)] of the discharge lamp is the cumulative lighting time tt until an illuminance maintenance rate of the discharge lamp decreases to 50% or less. The devitrification area is shown as a decrease rate [%] based on the comparative example 3. That is, the decrease rate of the devitrification area indicates how much the devitrification area in the discharge lamp decreases in the example 3 on the basis of the devitrification area of the discharge lamp in the comparative example 3 at the time when the cumulative lighting time tt is 6000 h. It was confirmed from Table 2 that the life of the discharge lamp is long and the devitrification area of the discharge lamp is small in the example 3 compared with the comparative example 3. Consequently, it was confirmed that the life of the discharge lamp can be improved by combining the second cooling control and the third cooling control.

The entire disclosure of Japanese Patent Application No. 2017-031829, filed Feb. 23, 2017 and No. 2017-031832, filed Feb. 23, 2017 are expressly incorporated by reference herein.

What is claimed is:
1. A projector comprising:
a discharge lamp including a pair of electrodes and configured to emit light;
a cooling section configured to cool the discharge lamp;
a control section configured to control the cooling section;
a light modulating device configured to modulate the light emitted from the discharge lamp according to image information; and
a projection optical device configured to project the light modulated by the light modulating device,
wherein the control section is configured to execute a first cooling control in which a number of revolutions of the cooling section does not depend on an inter-electrode voltage of the discharge lamp and a second cooling control for controlling the cooling section based on first control information indicating a relation between the inter-electrode voltage and the number of revolutions,
wherein the number of revolutions in the first cooling control is equal to or smaller than the number of revolutions in the second cooling control, and
wherein when the inter-electrode voltage is larger than a first voltage value or when a cumulative lighting time of the discharge lamp is larger than a first time, the control section is configured to switch the control of the cooling section from the first cooling control to the second cooling control.

2. The projector according to claim 1, wherein the number of revolutions in the first cooling control is constant.

3. The projector according to claim 1, wherein the relation, indicated by the first control information, between the inter-electrode voltage and the number of revolutions is indicated by a linear function.

4. The projector according to claim 1, wherein the number of revolutions in the first cooling control is smaller than the number of revolutions in the second cooling control at a time when the inter-electrode voltage is the first voltage value or is smaller than the number of revolutions in the second cooling control at a time when the cumulative lighting time is the first time.

5. The projector according to claim 1,
wherein the control section is configured to execute a third cooling control for controlling the cooling section based on second control information indicating a relation between the inter-electrode voltage and the number of revolutions,
wherein a degree of the number of revolutions corresponding to the inter-electrode voltage in the second control information is larger than a degree of the number of revolutions corresponding to the inter-electrode voltage in the first control information, and
wherein when devitrification is generated in the discharge lamp, the control section switches the control of the cooling section from the first cooling control or the second cooling control to the third cooling control.

6. The projector according to claim 5,
wherein the relation, indicated by the first control information, between the inter-electrode voltage and the number of revolutions is indicated by a linear function,
wherein the relation, indicated by the second control information, between the inter-electrode voltage and the number of revolutions is indicated by a linear function, and
wherein a ratio of a change amount of the number of revolutions to a change amount of the inter-electrode voltage in the second control information is larger than the ratio in the first control information.

7. The projector according to claim 5, wherein, when the devitrification is generated in the discharge lamp, the control section increases the number of revolutions.

8. The projector according to claim 5, wherein, when the cumulative lighting time of the discharge lamp is equal to or larger than a predetermined value, the control section determines that the devitrification is generated in the discharge lamp.

9. A projector comprising:
a discharge lamp including a pair of electrodes and configured to emit light;
a cooling section configured to cool the discharge lamp;
a control section configured to control the cooling section;
a light modulating device configured to modulate the light emitted from the discharge lamp according to image information; and
a projection optical device configured to project the light modulated by the light modulating device,
wherein the control section controls the cooling section based on control information indicating a relation between an inter-electrode voltage of the discharge lamp and a number of revolutions of the cooling section,
wherein when devitrification is generated in the discharge lamp, the control section is configured to increase a degree of the number of revolutions corresponding to the inter-electrode voltage in the control information, and
wherein when the devitrification is generated in the discharge lamp, the control section increases a ratio of a change amount of the number of revolutions to a change amount of the inter-electrode voltage in the control information.

10. The projector according to claim 9,
wherein the relation, indicated by the control information, between the inter-electrode voltage and the number of revolutions is indicated by a linear function.

11. The projector according to claim 9, wherein, when the devitrification is generated in the discharge lamp, the control section increases the ratio in a range smaller than three times.

12. The projector according to claim 9, wherein, when the devitrification is generated in the discharge lamp, the control section increases the number of revolutions.

13. The projector according to claim 9, wherein, when a cumulative lighting time of the discharge lamp is equal to or larger than a predetermined value, the control section determines that the devitrification is generated in the discharge lamp.

14. A control method for a projector including a discharge lamp including a pair of electrodes and a cooling section configured to cool the discharge lamp, the control method comprising:
executing a first cooling control in which a number of revolutions of the cooling section does not depend on an inter-electrode voltage of the discharge lamp and a second cooling control for controlling the cooling section based on first control information indicating a relation between the inter-electrode voltage and the number of revolutions, the number of revolutions in the first cooling control equal to or smaller than the number of revolutions in the second cooling control; and
switching the control of the cooling section from the first cooling control to the second cooling control when the inter-electrode voltage is larger than a first voltage value or when a cumulative lighting time of the discharge lamp is larger than a first time.

15. The control method according to claim 14, further comprising:
executing a third cooling control for controlling the cooling section based on second control information indicating a relation between the inter-electrode voltage and the number of revolutions, wherein a degree of the number of revolutions corresponding to the inter-electrode voltage in the second control information is larger than a degree of the number of revolutions corresponding to the inter-electrode voltage in the first control information; and
switching the control of the cooling section from the first cooling control or the second cooling control to the third cooling control when devitrification is generated in the discharge lamp.

16. A projector comprising:
a discharge lamp including a pair of electrodes and configured to emit light;
a cooling section configured to cool the discharge lamp;
a control section configured to control the cooling section;
a light modulating device configured to modulate the light emitted from the discharge lamp according to image information; and a projection optical device configured to project the light modulated by the light modulating device, wherein the control section controls the cooling section based on control information indicating a relation between an inter-electrode voltage of the discharge lamp and a number of revolutions of the cooling section, wherein when devitrification is generated in the discharge lamp, the control section is configured to increase a degree of the number of revolutions corresponding to the inter-electrode voltage in the control information, and wherein, when a cumulative lighting time of the discharge lamp is equal to or larger than a predetermined value, the control section determines that the devitrification is generated in the discharge lamp.

* * * * *